United States Patent
Kalafatis et al.

(10) Patent No.: US 6,865,740 B2
(45) Date of Patent: Mar. 8, 2005

(54) METHOD AND SYSTEM TO INSERT A FLOW MARKER INTO AN INSTRUCTION STREAM TO INDICATE A THREAD SWITCHING OPERATION WITHIN A MULTITHREADED PROCESSOR

(75) Inventors: Stavros Kalafatis, Portland, OR (US); Alan B. Kyker, Portland, OR (US); Robert D. Fisch, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 10/248,000

(22) Filed: Sep. 20, 2002

(65) Prior Publication Data

US 2003/0023834 A1 Jan. 30, 2003

Related U.S. Application Data

(63) Continuation of application No. 09/302,633, filed on Apr. 29, 1999, now Pat. No. 6,535,905.

(51) Int. Cl.$^7$ .............................................. G06F 9/00
(52) U.S. Cl. ...................... 718/108; 718/103; 712/219; 712/228
(58) Field of Search ................................. 718/103, 105, 718/106, 107, 108; 712/219, 228, 207, 23; 711/129

(56) References Cited

U.S. PATENT DOCUMENTS

| | | | |
|---|---|---|---|
| 3,771,138 A | | 11/1973 | Celtruda et al. |
| 5,325,526 A | * | 6/1994 | Cameron et al. ............ 709/102 |
| 5,357,617 A | | 10/1994 | Davis et al. |
| 5,361,337 A | | 11/1994 | Okin |
| 5,386,561 A | | 1/1995 | Huynh et al. |
| 5,392,437 A | | 2/1995 | Matter et al. |
| 5,404,469 A | | 4/1995 | Chung et al. |
| 5,430,850 A | | 7/1995 | Papadopoulos et al. |
| 5,499,349 A | | 3/1996 | Nikhil et al. |
| 5,524,263 A | | 6/1996 | Griffth et al. |

(List continued on next page.)

FOREIGN PATENT DOCUMENTS

| | | |
|---|---|---|
| EP | 0 346 003 A2 | 12/1989 |
| EP | 0 352 935 A2 | 1/1990 |

(List continued on next page.)

OTHER PUBLICATIONS

Dean M. Tullsen, et al., "Exploiting Choice: Instruction Fetch and Issue on an Implementable Simultaneous Multithreading Processor" Dept. of Computer Science & Engineering, University of WA, Seattle, WA, 5/94.

(List continued on next page.)

*Primary Examiner*—Larry D. Donaghue
(74) *Attorney, Agent, or Firm*—Blakley, Sokoloff, Taylor & Zafman LLP

(57) ABSTRACT

A method of performing a thread switching operation within a multithreaded processor includes detecting the dispatch of a first predetermined quantity of instruction information of a first thread, from an instruction streaming buffer to an instruction pre-decoder within the multithreaded processor. Responsive to the detection of the dispatch of the first predetermined quantity of instruction information of the first thread, a thread switching operation is performed with respect to the output of the instruction streaming buffer. A flow marker is inserted into an instruction stream, the instruction stream including the instruction information of the first thread dispatched from the instruction information source, and the flow marker indicating that the thread switching operation has occurred. The dispatch of instruction information for a second thread from the instruction streaming buffer is thus commenced.

16 Claims, 17 Drawing Sheets

U.S. PATENT DOCUMENTS

| | | | |
|---|---|---|---|
| 5,528,513 A | * | 6/1996 | Vaitzblit et al. ............ 709/103 |
| 5,553,291 A | | 9/1996 | Tanaka et al. |
| 5,586,332 A | | 12/1996 | Jain et al. |
| 5,630,130 A | | 5/1997 | Perotto et al. |
| 5,742,782 A | * | 4/1998 | Ito et al. ..................... 712/210 |
| 5,761,522 A | | 6/1998 | Hisanaga et al. |
| 5,787,297 A | | 7/1998 | Lin |
| 5,809,271 A | | 9/1998 | Colwell et al. |
| 5,809,522 A | | 9/1998 | Novak et al. |
| 5,892,959 A | | 4/1999 | Fung |
| 5,968,160 A | | 10/1999 | Saito et al. |
| 5,983,339 A | | 11/1999 | Klim |
| 5,996,085 A | | 11/1999 | Cheong et al. |
| 6,009,454 A | | 12/1999 | Dummermuth |
| 6,052,708 A | | 4/2000 | Flynn et al. |
| 6,085,215 A | * | 7/2000 | Ramakrishnan et al. .... 709/102 |
| 6,085,218 A | | 7/2000 | Carmon |
| 6,088,788 A | | 7/2000 | Borkenhagen et al. |
| 6,092,175 A | | 7/2000 | Levy et al. |
| 6,105,127 A | | 8/2000 | Kimura et al. |
| 6,212,544 B1 | | 4/2001 | Borkenhagen et al. |
| 6,256,775 B1 | | 7/2001 | Flynn |
| 6,289,461 B1 | | 9/2001 | Dixon |
| 6,314,530 B1 | | 11/2001 | Mann |
| 6,330,584 B1 | * | 12/2001 | Joffe et al. .................. 709/107 |
| 6,470,376 B1 | | 10/2002 | Tanaka et al. |
| 6,535,905 B1 | * | 3/2003 | Kalafatis et al. ............ 709/108 |
| 6,625,635 B1 | | 9/2003 | Elnozahy |

FOREIGN PATENT DOCUMENTS

| | | |
|---|---|---|
| EP | 0 725 335 A1 | 8/1996 |
| EP | 0 747 816 A2 | 12/1996 |
| EP | 0 768 508 A3 | 4/1997 |
| EP | 0 768 608 A2 | 4/1997 |
| EP | 0 827 071 A2 | 3/1998 |
| EP | 0 856 797 A1 | 8/1998 |
| EP | 0 863 462 A2 | 9/1998 |
| EP | 0 864 960 A1 | 9/1998 |
| EP | 0 962 856 A2 | 12/1999 |
| GB | 2311880 A | 10/1997 |
| WO | WO 99/21082 A1 | 4/1999 |
| WO | WO 99/21088 A1 | 4/1999 |

OTHER PUBLICATIONS

Roa P. Pokala, et al., "Physical Synthesis for Performance Optimization", Vertex Semiconductor, San Jose, CA, 2/92.

Gregory T. Byrd, et al., "Multithreaded Processor Architectures", Western Carolina University, 8045 IEEE Spectrum, 32 (1995) Aug., No. 8, New York, U.S.

Mark R. Thistle, et al., "A Processor Architecture For Horizon", Institute for Defense Analyses, Supercomputing Research Center, Lanham, Maryland 20706, 9/98.

Steere D, et al., "A Feedback–driven Proportion Allocator for Real–Rate Scheduling", *Third Symposium on Operating Systems Design and Implementations*, Feb. 22–25, 1999, pp. 145–158, XP002153159.

INTEL, "P6 Family of Processors", *Hardware Developer's Manual*, Sep. 1998, XP–002153160.

IBM, "Improved Dispatching in a Rendering Context Manager", *IBM Technical Disclosure Bulletin*, Dec. 1990, pp. 131–134, vol. 33, No. 7, XP000108363 ISSN: 0018–18689, Armonk, NY.

Farrens, MK; Pleszkun, AR., "Strategies for Archieving Improved Processor Throughput", *The 18th Annual International Symposium on Computer Architecture*, May 27–30, 1991, pp. 362–369.

Mendelson, A; Berkerman, M., "Design Alternatives of Multithreaded Architecture", *International Journal of Parallel Programming*, Dec. 9, 1996, vol. 27, No. 3, pp. 161–193, Pullenum Publishing Corporation.

James Laudon, Anoop Gupta and Mark Horowitz, "Architectural and Implementation Tradeoffs in the Design of Multiple–Context Processors", *Multithreaded Computer Architecture: A Summary of the State of the Art*, chapter 8, pp. 167–200, Kluwer Academic Publishers 1994.

Dean M. Tullsen, Susan J. Eggers, Joel S. Emer, Henry M. Levy, Jack L. Lo and Rebecca L. Stammm, "Exploiting Choice: Instruction Fetch and Issue on an Implementable Simultaneous Multithreading Processor", *Proceedings of the 23rd Annual International Symposium on Computer Architecture*, May 22–24, 1996, pp 191–202.

Richard J. Eickemeyer, Ross E. Johnson, Steven R. Kunkel, Mark S. Squillante and Shiafun Liu, "Evaluation of Multithreaded Uniprocessors for Commercial Application Environments", *Proceedings of the 23rd Annual International Symposium on Computer Architecture*. May 22–24, 1996, pp 203–212.

Manu Gulati and Nader Bagherzadeh, "Performance Study of a Multithreaded Superscalar Microprocessor", *Proceedings Second International Symposium on High–Performance Computer Architecture*, Feb. 3–7, 1996, pp 291–301.

R. Guru Prasadh and Chuan–Lin Wu, "A Benchmark Evaluation of a Multi–Threaded RISC Processor Architecture", *1991 International Conference on Parallel Processing*, pp I–84–191.

Peter Song, "Multithreading Comes of Age", *Microdesign Resources*, Jul. 14, 1997, pp. 13–18.

Dennis Lee, Jean–Loup Baer, Brad Calder and Dirk Grunwald, "Instruction Cache Fetch Policies for Speculative Execution", 22nd International Symposium on Computer Architecture, Jun. 1995.

Ruediger R. Asche, "Multithreading for Rookies", Http://www.microsoft.com/win32dev/base/threads.htm, Jul. 31, 1998.

Simon W. Moore, "Multithreaded Processor Design", Kluwer Academic Publishers, 1996.

Dongwook K., et al., "A Partitioned On–Chip Virtual Cache For Fast Processors", Journal of Systems Architecture, Elsevier Science Publishers BV., Amsterdam, NL, vol. 43, No. 8, May 1, 1997, pp. 519–531, XP000685730.

Rosenberg Dictionary of Computers, Information Processing and Telecommunications, pp. 299–300, 1987.

* cited by examiner

METHOD AND SYSTEM TO INSERT A FLOW MARKER INTO AN INSTRUCTION STREAM TO INDICATE A THREAD SWITCHING OPERATION WITHIN A MULTITHREADED PROCESSOR

CROSS REFERENCE TO RELATED APPLICATIONS

This application is a continuation of patent application Ser. No. 09/302,633, filed Apr. 29, 1999 now U.S. Pat. No. 6,535,905.

FIELD OF THE INVENTION

The present invention relates generally to the field of multithreaded processors and, more specifically, to a method and apparatus for performing context (or thread) switching within a multithreaded processor.

BACKGROUND OF THE INVENTION

Multithreaded processor design has recently been considered as an increasingly attractive option for increasing the performance of processors. Multithreading within a processor, inter alia, provides the potential for more effective utilization of various processor resources, and particularly for more effective utilization of the execution logic within a processor. Specifically, by feeding multiple threads to the execution logic of a processor, clock cycles that would otherwise have been idle due to a stall or other delay in the processing of a particular thread may be utilized to service a further thread. A stall in the processing of a particular thread may result from a number of occurrences within a processor pipeline. For example, a cache miss or a branch missprediction (i.e., a long-latency operation) for an instruction included within a thread typically results in the processing of the relevant thread stalling. The negative effect of long-latency operations on execution logic efficiencies is exacerbated by the recent increases in execution logic throughput that have outstripped advances in memory access and retrieval rates.

Multithreaded computer applications are also becoming increasingly common in view of the support provided to such multithreaded applications by a number of popular operating systems, such as the Windows NT® and Unix operating systems. Multithreaded computer applications are particularly efficient in the multi-media arena.

Multithreaded processors may broadly be classified into two categories (i.e., fine or coarse designs) according to the thread interleaving or switching scheme employed within the relevant processor. Fine multithreaded designs support multiple active threads within a processor and typically interleave two different threads on a cycle-by-cycle basis. Coarse multithreaded designs typically interleave the instructions of different threads on the occurrence of some long-latency event, such as a cache miss. A coarse multithreaded design is discussed in Eickemayer, R.; Johnson, R.; et al., "Evaluation of Multithreaded Uniprocessors for Commercial Application Environments", *The 23rd Annual International Symposium on Computer Architecture.* pp. 203–212, May 1996. The distinctions between fine and coarse designs are further discussed in Laudon, J; Gupta, A, "Architectural and Implementation Tradeoffs in the Design of Multiple-Context Processors", *Multithreaded Computer Architectures: A Summary of the State of the Art*, edited by R. A. Iannuci et al., pp. 167–200, Kluwer Academic Publishers, Norwell, Mass., 1994. Laudon further proposes an interleaving scheme that combines the cycle-by-cycle switching of a fine design with the full pipeline interlocks of a coarse design (or blocked scheme). To this end, Laudon proposes a "back off" instruction that makes a specific thread (or context) unavailable for a specific number of cycles. Such a "back off" instruction may be issued upon the occurrence of predetermined events, such as a cache miss. In this way, Laudon avoids having to perform an actual thread switch by simply making one of the threads unavailable.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for thread switching within a multithreaded processor are described. In the following description, for purposes of explanation, numerous specific details are set forth in order to provide a thorough understanding of the present invention. It will be evident, however, to one skilled in the art that the present invention may be practiced without these specific details.

For the purposes of the present specification, the term "dispatch" shall be taken to encompass the actual sending or propagation of data from a location or functional unit, as well as the steps that are taken in preparation for the actual sending or propagation of the data. For example, the term "dispatch" shall be taken to include the placement of data in a particular order or state of readiness to be propagated from a storage location or buffer.

Processor Pipeline

Figure 1:
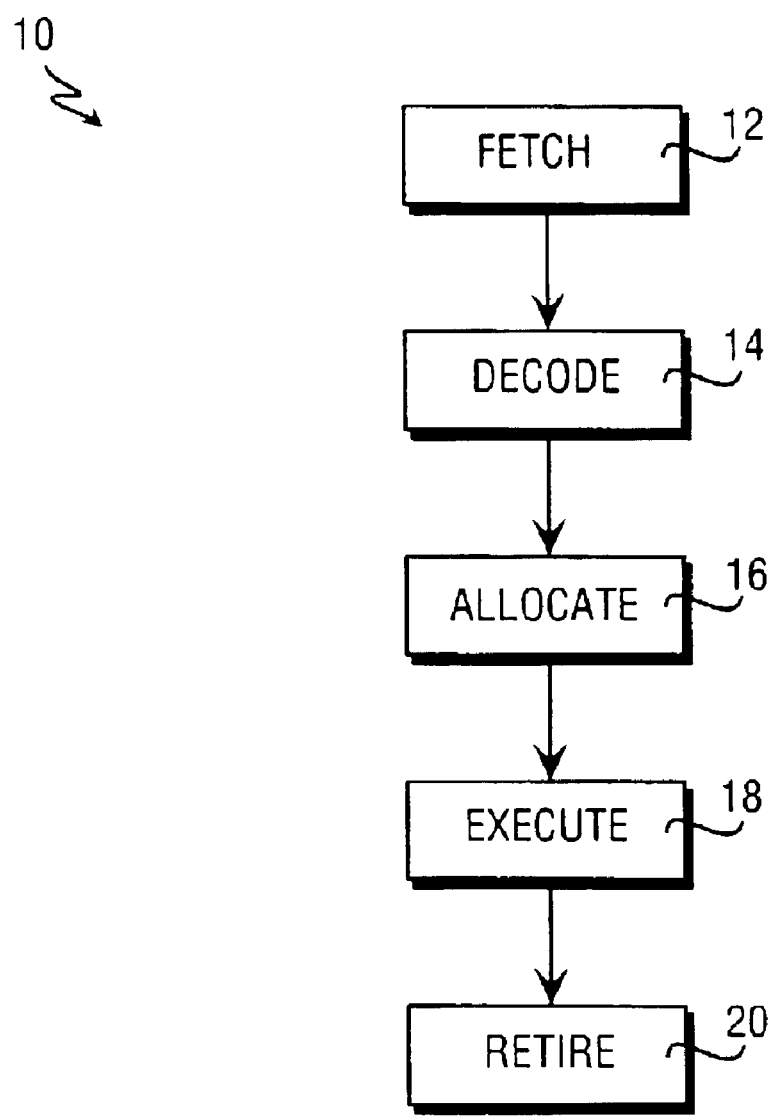
FIG. 1 is a block diagram illustrating an exemplary pipeline of a processor within which the present invention may be implemented.

FIG. 1 is a high-level block diagram illustrating an exemplary embodiment of processor pipeline 10 within which the present invention may be implemented. For the purposes of the present specification, the term "processor" shall be taken to refer to any machine that is capable of executing a sequence of instructions (e.g., macro- or microinstructions), and shall be taken to include, but not be limited to, general purpose microprocessors, special purpose microprocessors, graphics controllers, audio controllers, multi-media controllers and microcontrollers. Further, the term "processor" shall be taken to refer to, inter alia, Complex Instruction Set Computers (CISC), Reduced Instruction Set Computers (RISC), or Very Long Instruction Word (VLIW) processors. The pipeline 10 includes a number of pipe stages, commencing with a fetch pipe stage 12 at which instructions (e.g., macroinstructions) are retrieved and fed into the pipeline 10. For example, a macroinstruction may be retrieved from a cache memory that is integral with the processor, or closely associated therewith, or may be retrieved from an external main memory via a processor bus. From the fetch pipe stage 12, the macroinstructions are propagated to a decode pipe stage 14, where macroinstructions are translated into microinstructions (also termed "microcode") suitable for execution within the processor. The microinstructions are then propagated downstream to an allocate pipe stage 16, where processor resources are allocated to the various microinstructions according to availability and need. The microinstructions are then executed at an execute stage 18 before being retired at a retire pipe stage 20.

Microprocessor Architecture

Figure 2:
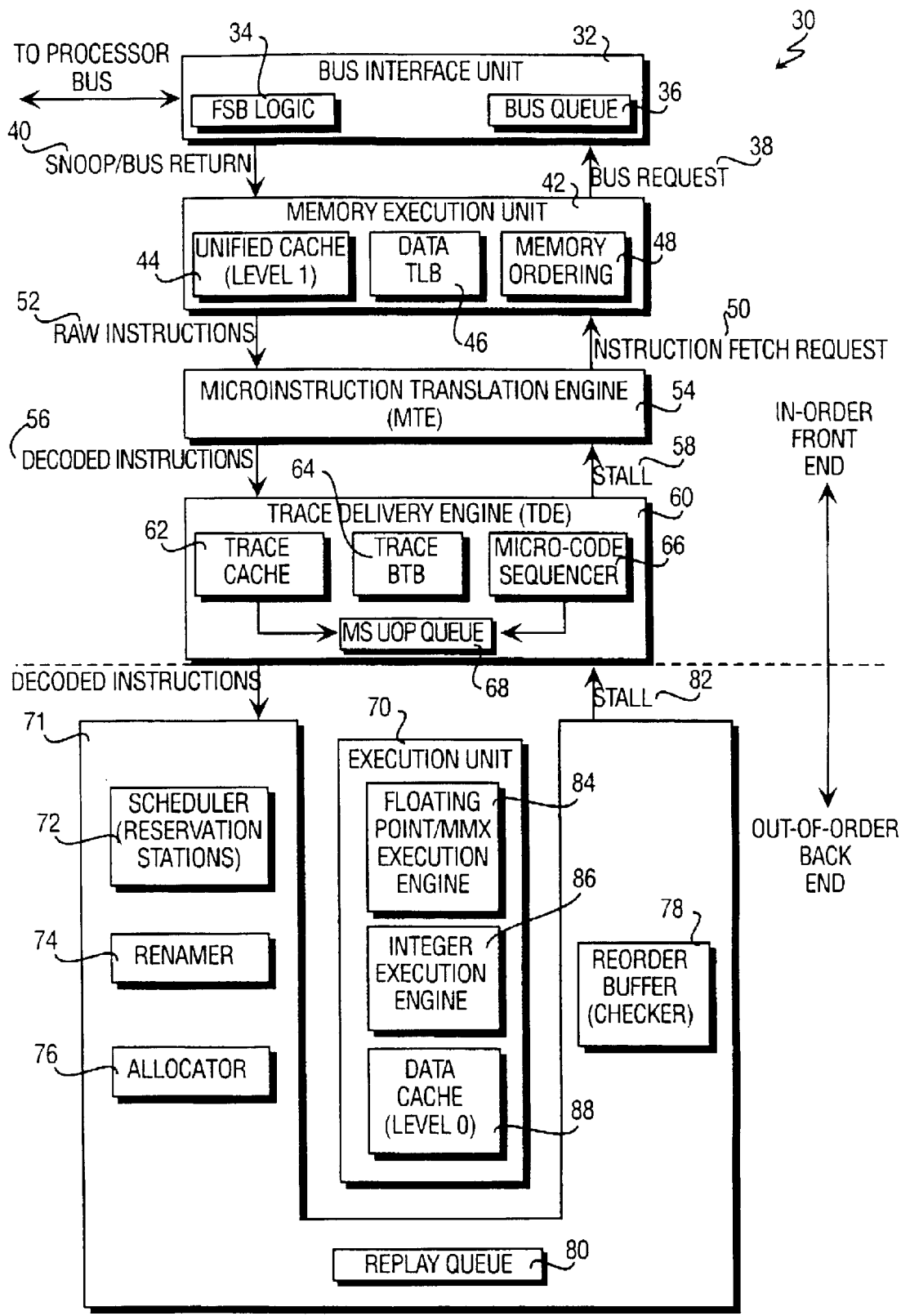
FIG. 2 is a block diagram illustrating an exemplary embodiment of processor, in the form of a general-purpose multithreaded microprocessor, within which the present invention may be implemented.

FIG. 2 is a block diagram illustrating an exemplary embodiment of a processor, in the form of a general-purpose microprocessor 30, within which the present invention may be implemented. The microprocessor 30 is described below as being a multithreaded (MT) processor, and is accordingly able simultaneously to process multiple instruction threads (or contexts). However, a number of the teachings provided below in the specification are not specific to a multithreaded processor, and may find application in a single threaded processor. In an exemplary embodiment, the microprocessor 30 may comprise an Intel Architecture (IA) microprocessor that is capable of executing the Intel Architecture instruction set.

The microprocessor 30 comprises an in-order front end and an out-of-order back end. The in-order front end includes a bus interface unit 32, which functions as the conduit between the microprocessor 30 and other components (e.g., main memory) of a computer system within which the microprocessor 30 may be employed. To this end, the bus interface unit 32 couples the microprocessor 30 to a processor bus (not shown) via which data and control information may be received at and propagated from the microprocessor 30. The bus interface unit 32 includes Front Side Bus (FSB) logic 34 that controls communications over the processor bus. The bus interface unit 32 further includes a bus queue 36 that provides a buffering function with respect to communications over the processor bus. The bus interface unit 32 is shown to receive bus requests 38 from, and to send snoops or bus returns to, a memory execution unit 42 that provides a local memory capability within the microprocessor 30. The memory execution unit 42 includes a unified data and instruction cache 44, a data Translation Lookaside Buffer (TLB) 46, and memory ordering logic 48. The memory execution unit 42 receives instruction fetch requests 50 from, and delivers raw instructions 52 (i.e., coded macroinstructions) to, a microinstruction translation engine 54 that translates the received macroinstructions into a corresponding set of microinstructions. Further details regarding the microinstruction translation engine 54 are provided below.

From the microinstruction translation engine 54, decoded instructions (i.e., microinstructions) are sent to a trace delivery engine 60. The trace delivery engine 60 includes a trace cache 62, a trace branch predictor (BTB) 64, a microcode sequencer 66 and a microcode (uop) queue 68. The trace delivery engine 60 functions as a microinstruction cache, and is the primary source of microinstructions for a downstream execution unit 70. By providing a microinstruction caching function within the processor pipeline, the trace delivery engine 60, and specifically the trace cache 62, allows translation work done by the microinstruction translation engine 54 to be leveraged to provide a relatively high microinstruction bandwidth. In one exemplary embodiment, the trace cache 62 may comprise a 256 set, 8 way set associate memory. The term "trace", in the present exemplary embodiment, may refer to a sequence of microinstructions stored within entries of the trace cache 62, each entry including pointers to preceding and proceeding microinstructions comprising the trace. In this way, the trace cache 62 facilitates high-performance sequencing in that the address of the next entry to be accessed for the purposes of obtaining a subsequent microinstruction is known before a current access is complete. Traces may be viewed as "blocks" of instructions that are distinguished from one another by trace heads, and are terminated upon encountering an indirect branch or by reaching one of many present threshold conditions, such as the number of conditioned branches that may be accommodated in a single trace or the maximum number of total microinstructions that may comprise a trade.

The trace cache branch predictor 64 provides local branch predictions pertaining to traces within the trace cache 62. The trace cache 62 and the microcode sequencer 66 provide microinstructions to the microcode queue 68, from where the microinstructions are then fed to an out-of-order execution cluster. Accordingly, the microprocessor 30 may be viewed as having an in-order front-end, comprising the bus interface unit 32, the memory execution unit 42, the microinstruction translation engine 54 and the trace delivery engine 60, and an out-of-order back-end that will be described in detail below.

Microinstructions dispatched from the microcode queue 68 are received into an out-of-order cluster 71 comprising a scheduler 72, a register renamer 74, an allocator 76, a reorder buffer 78 and a replay queue 80. The scheduler 72 includes a set of reservation stations, and operates to schedule and dispatch microinstructions for execution by the execution unit 70. The register renamer 74 performs a register renaming function with respect to hidden integer and floating point registers (that may be utilized in place of any of the eight general purpose registers or any of the eight floating-point registers, where a microprocessor 30 executes the Intel Architecture instruction set). The allocator 76 operates to allocate resources of the execution unit 70 and the cluster 71 to microinstructions according to availability and need. In the event that insufficient resources are available to process a microinstruction, the allocator 76 is responsible for asserting a stall signal 82, that is propagated through the trace delivery engine 60 to the microinstruction translation engine 54, as shown at 58. Microinstructions, which have had their source fields adjusted by the register renamer 74, are placed in a reorder buffer 78 in strict program order. When microinstructions within the reorder buffer 78 have completed execution and are ready for retirement, they are then removed from the reorder buffer 78. The replay queue 80 propagates microinstructions that are to be replayed to the execution unit 70.

The execution unit 70 is shown to include a floating-point execution engine 84, an integer execution engine 86, and a level 0 data cache 88. In one exemplary embodiment in which is the microprocessor 30 executes the Intel Architecture instruction set, the floating point execution engine 84 may further execute MMX® instructions.

Microinstruction Translation Engine

Figure 3:
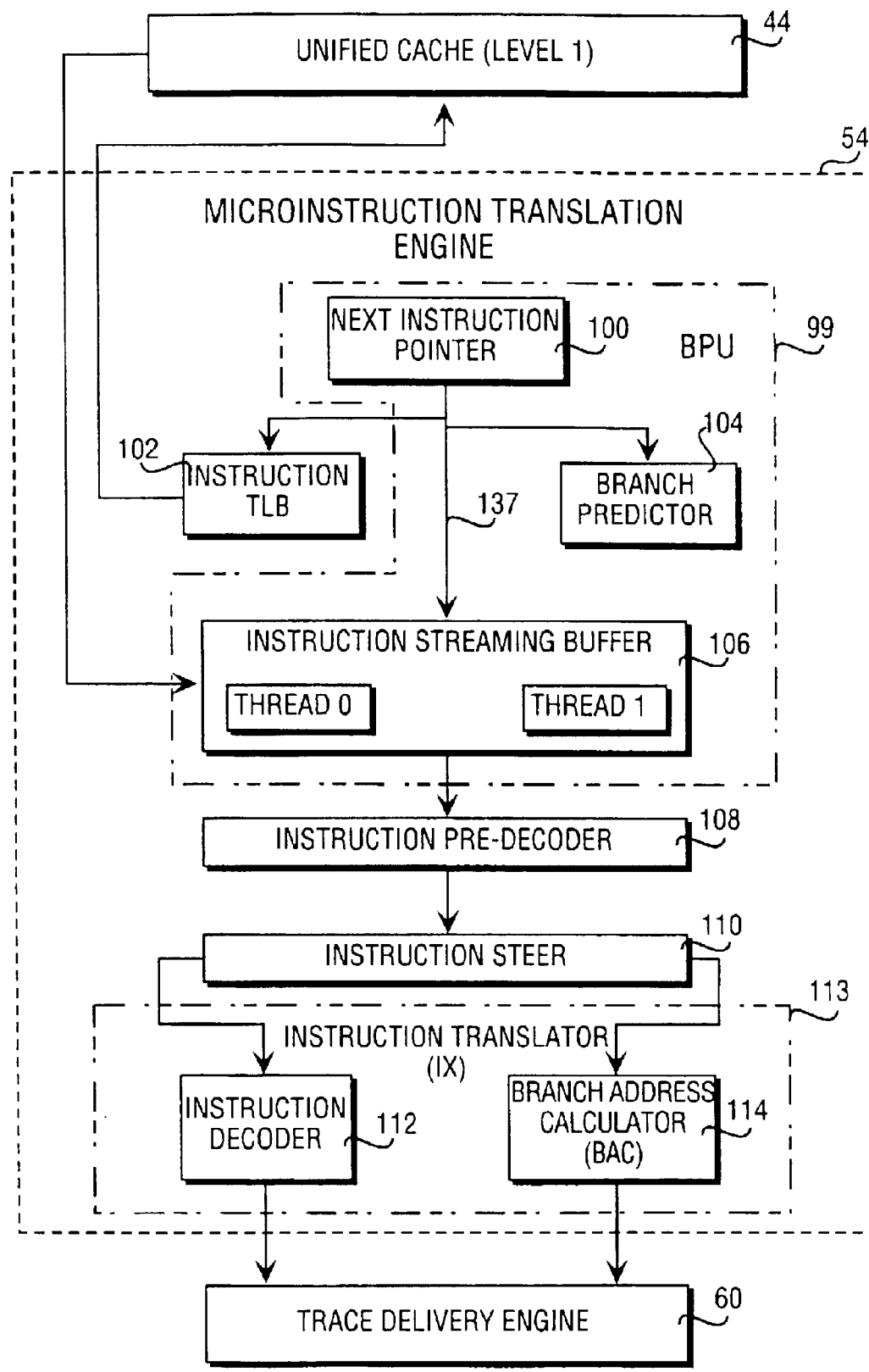
FIG. 3 is a block diagram providing further details regarding the architecture of an exemplary embodiment of a microinstruction translation engine included within the general-purpose microprocessor illustrated in FIG. 2.

FIG. 3 is a block diagram providing further details regarding the architecture an exemplary embodiment of the microinstruction translation engine 54. The microinstruction translation engine 54 effectively operates as a trace cache "miss handler" in that it operates to deliver microinstructions to the trace cache 62 in the event of a trace cache miss. To this end, the microinstruction translation engine 54 functions to provide the fetch and decode pipe stages 12 and 14 in the event of a trace cache miss. The microinstruction translation engine 54 is shown to include a next instruction pointer (NIP) 100, an instruction Translation Lookaside Buffer (TLB) 102, a branch predictor 104, an instruction streaming buffer 106, an instruction pre-decoder 108, instruction steering logic 110, an instruction decoder 112, and a branch address calculator 114. The next instruction pointer 100, TLB 102, branch predictor 104 and instruction streaming buffer 106 together constitute a branch prediction unit (BPU) 99. The instruction decoder 112 and branch address calculator 114 together comprise an instruction translate (IX) unit 113.

The next instruction pointer 100 issues next instruction requests to the unified cache 44. In the exemplary embodiment where the microprocessor 30 comprises a multi-threaded microprocessor capable of processing two threads, the next instruction pointer 100 may include a multiplexer (MUX) (not shown) that selects between instruction pointers associated with either the first or second thread for inclusion within the next instruction request issued therefrom. In one embodiment, the next instruction pointer 100 will interleave next instruction requests for the first and second threads on a cycle-by-cycle ("ping pong") basis, assuming instructions for both threads have been requested, and instruction streaming buffer 106 resources for both of the threads have not been exhausted. The next instruction pointer requests may be for either 16, 32 or 64 bytes depending on whether the initial request address is in the upper half of a 32-byte or 64-byte aligned line. The next instruction pointer 100 may be redirected by the branch predictor 104, the branch address calculator 114 or by the trace cache 62, with a trace cache miss request being the highest priority redirection request.

When the next instruction pointer 100 makes an instruction request to the unified cache 44, it generates a two-bit "request identifier" that is associated with the instruction request and functions as a "tag" for the relevant instruction request. When returning data responsive to an instruction request, the unified cache 44 returns the following tags or identifiers together with the data:

1. The "request identifier" supplied by the next instruction pointer 100;
2. A three-bit "chunk identifier" that identifies the chunk returned; and
3. A "thread identifier" that identifies the thread to which the returned data belongs.

Next instruction requests are propagated from the next instruction pointer 100 to the instruction TLB 102, which performs an address lookup operation, and delivers a physical address to the unified cache 44. The unified cache 44 delivers a corresponding macroinstruction to the instruction streaming buffer 106. Each next instruction requests is also propagated directly from the next instruction pointer 100 to the instruction streaming buffer 106 so as to allow the instruction streaming buffer 106 to identify the thread to which a macroinstruction received from the unified cache 44 belongs. The macroinstructions from both first and second threads are then issued from the instruction streaming buffer 106 to the instruction pre-decoder 108, which performs a number of length calculation and byte marking operations with respect to a received instruction stream (of macroinstructions). Specifically, the instruction pre-decoder 108 generates a series of byte marking vectors that serve, inter alia, to demarcate macroinstructions within the instruction stream propagated to the instruction steering logic 110. The instruction steering logic 110 then utilizes the byte marking vectors to steer discrete macroinstructions to the instruction decoder 112 for the purposes of decoding. Macroinstructions are also propagated from the instruction steering logic 110 to the branch address calculator 114 for the purposes of branch address calculation. Microinstructions are then delivered from the instruction decoder 112 to the trace delivery engine 60.

Multithreading Implementation

In the exemplary embodiment of the microprocessor 30 illustrated FIG. 2, it will be noted that there is limited duplication or replication of resources. In order to provide a multithreading capability within a processor within which there is limited replication of functional units it is necessary to implement some degree of resource sharing between threads. The resource sharing scheme employed, it will be appreciated, is dependent upon the number of threads that the processor is able simultaneously to process. As functional units within a processor typically provide some buffering (or storage) functionality and propagation functionality, the issue of resource sharing may be viewed as comprising (1) storage and (2) processing/propagating bandwidth sharing components. For example, in a processor that supports the simultaneous processing of two threads, buffer resources within various functional units may be logically partitioned and allocated between two threads. Similarly, the bandwidth provided by a path for the propagation of information between two functional units must be divided and allocated between the two threads. As these resource sharing issues may arise at a number of locations within a processor pipeline, different resource sharing schemes may be employed at these various locations in accordance with the dictates and characteristics of the specific location. It will be appreciated that different resource sharing schemes may be suited to different locations in view of varying functionalities and operating characteristics.

Figure 4:
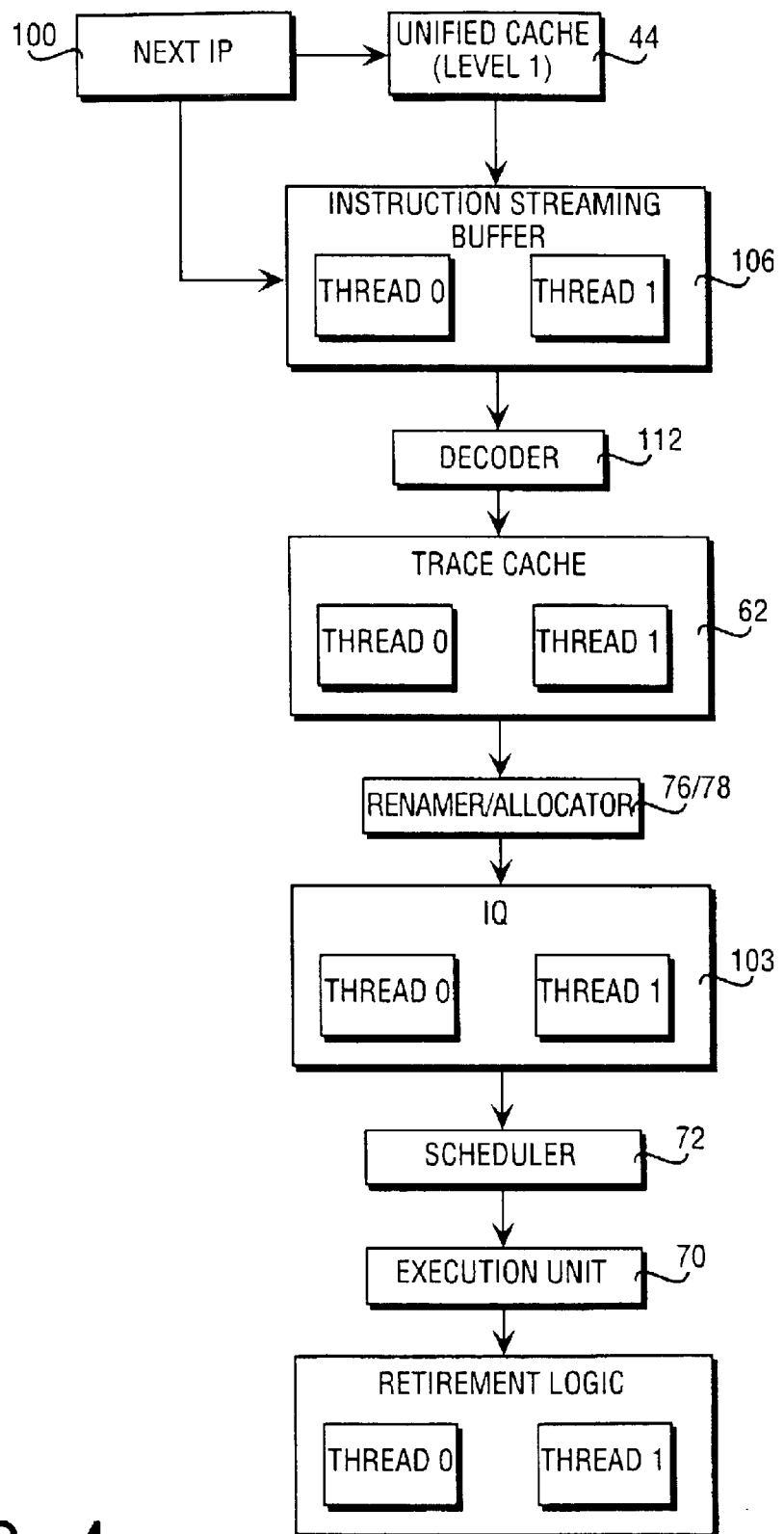
FIG. 4 is a block diagram illustrating selected components of an exemplary multithreaded microprocessor, and specifically depicts various functional units that provide a buffering capability as being logically partition to accommodate multiple thread.

FIG. 4 is a block diagram illustrating selected components of the microprocessor 30 illustrated in FIG. 3, and depicts various functional units that provide a buffering capability as being logically partitioned to accommodate two threads (i.e., thread 0 and thread 1). The logical partitioning for two threads of the buffering (or storage) facilities of a functional unit may be achieved by allocating a first predetermined set of entries within a buffering resource to a first thread and allocating a second predetermined set of entries within the buffering resource to a second thread. Specifically, this may be achieved by providing two pairs of read and write pointers, a first pair of read and write pointers being associated with a first thread and a second pair of read and write pointers being associated with a second thread. The first set of read and write pointers may be limited to a first predetermined number of entries within a buffering resource, while the second set of read and write pointers may be limited to a second predetermined number of entries within the same buffering resource. In the exemplary embodiment, the instruction streaming buffer 106, the trace cache 62, and an instruction queue 103 are shown to each provide a storage capacity that is logically partitioned between the first and second threads.

The issue of bandwidth allocation for a path between functional units within a processor will now be discussed in further detailed below.

Instruction Streaming Buffer

Referring to FIG. 3, the instruction streaming buffer 106 feeds an instruction stream into a single instruction decoder 112 (i.e., there is no decoder replication). In order to make efficient use of this single decoding resource, it is desirable to ensure that the bandwidth of the path between the instruction streaming buffer 106 and the instruction decoder 112, and accordingly the "decoding bandwidth" of the instruction decoder 112, be divided and allocated in an efficient manner. The thread switching may be implemented with respect to two instruction streams fed from the instruction streaming buffer 106. This thread switching methodology determines the rate at which instructions for each of the two threads are fed to the instruction decoder 112. An exemplary thread switching algorithm (or exemplary algorithms) may attempt to achieve the following thread switching characteristics:

To perform a switch thread only when a further thread has data that may be propagated downstream (e.g., from the instruction streaming buffer 106);

To switch threads when a current thread is being incorrectly executed (e.g., when a current thread receives a back end clear);

To switch threads so as to guarantee forward progress within the downstream pipeline before performing the thread switch (e.g., by ensuring that at least one further full instruction for a current thread will be issued from the instruction streaming buffer 106 prior to performing a thread switch from a current thread to a target thread);

To prevent one thread from starving other threads (e.g., by performing a thread switching operation only once a predetermined quantity of instruction information for a current thread has been propagated down the processor pipeline without any other thread switching mechanisms having been invoked); and To amortize a thread switching penalty (e.g., by issuing a predetermined minimum quantity of instruction information before looking for a taken branch that may trigger a thread switching operation).

Figure 5:
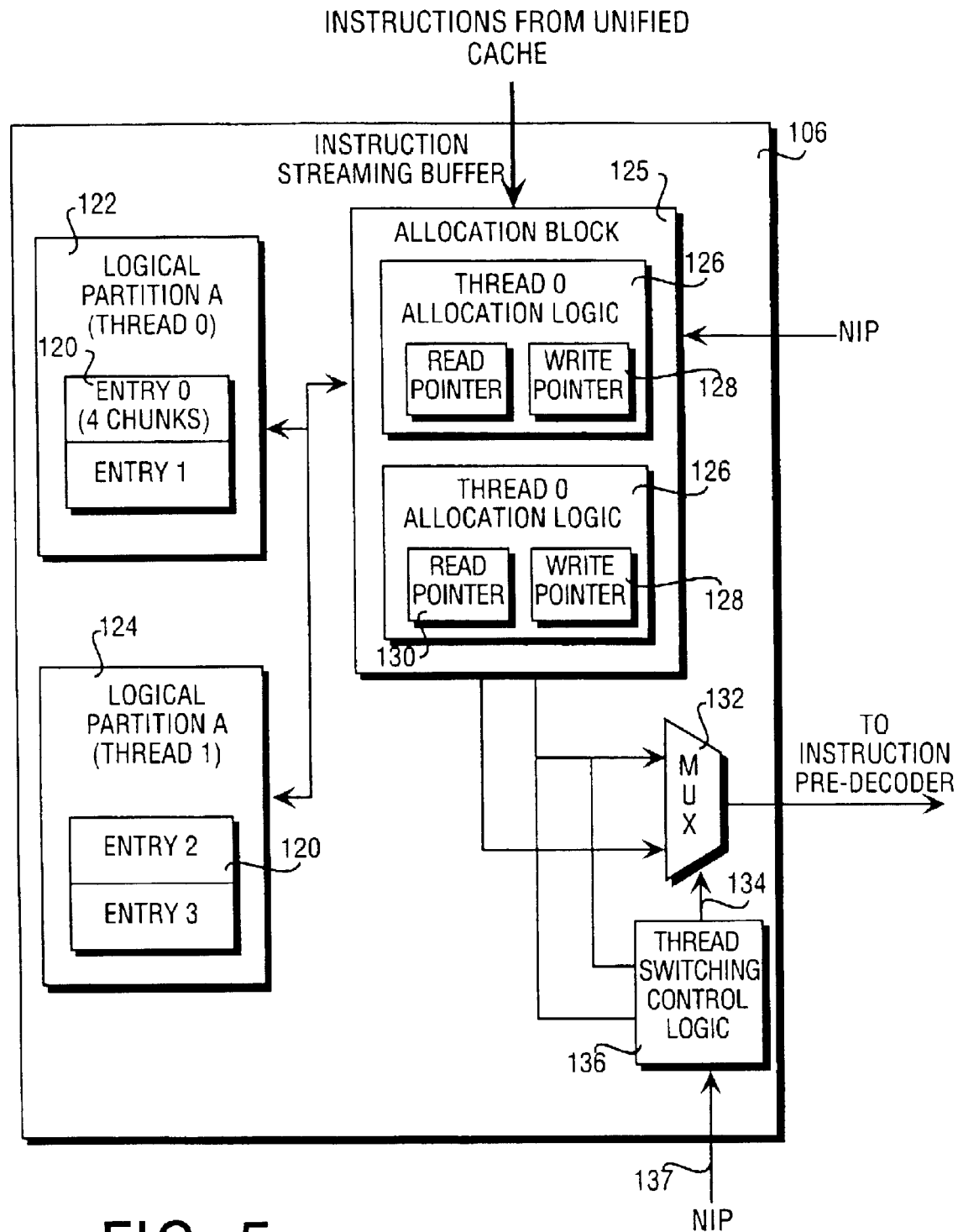
FIG. 5 is a block diagram illustrating further details regarding the structure and architecture of an exemplary instruction streaming buffer, according to one embodiment of the present invention.

The present invention will now be described with reference to an exemplary embodiment that is utilized to select between thread data, buffered within the instruction streaming buffer 106, for propagation down a unitary path towards the instruction decoder 112. However, it will readily be appreciated that the teachings of the present invention may be utilized at any location within a processor pipeline for the purposes of thread switching or interleaving. FIG. 5 is a block diagram showing further details regarding the structure and architecture of the instruction streaming buffer 106. Specifically, the instruction streaming buffer 106 is shown to include a storage array having 4 entries 120 (entry 0–entry 3) that are logically partitioned into a first partition 122 dedicated to storing instructions of a first thread (thread 0) and a second partition 124 dedicated to storing instructions of a second thread (thread 1). In one exemplary embodiment, each of the entries 120 is able to accommodate 8 chunks of information, and accordingly the instruction streaming buffer 106 provides 16 chunks of data cache per thread.

The instruction streaming buffer 106 further includes an allocation block 125 that controls the writing and reading of data to and from the logical partitions 122 and 124.

Each of the partitions 122 and 124 has respective allocation logic 126, included within the allocation block 125. Each allocation logic 126 includes a write pointer 128 and a read pointer 130 that each reference an entry 120 within the associated partition 122 or 124. Each allocation logic 26 receives an instruction stream from the unified cache 44, and writes chunks (i.e., 8 bytes) of the instruction stream into an entry 120 of the first or second partition 122 or 124 according to thread specifications. Specifically, by examining the "thread identifier" associated with each chunk of data, each allocation logic 26 is able to determine to which partition to write the data received from the unified cache 44.

Each of the allocation logics 126 outputs data from a respective partition 122 or 124 to a MUX 132 that selects between the outputs of the partitions 122 and 124 based on a thread selection signal 134 asserted by thread switching control logic 136. Accordingly, in the exemplary embodiment of the present invention, it is the thread switching control logic 136 that implements the thread interleaving or switching scheme. The thread switching control logic 136 is furthermore shown to monitor the outputs of each of the partitions 122 or 124 via lines 138 and 140 so as to be able to determine when a chunk of data is dispatched from either of the partitions 122 or 124, and to identify from which of these partitions the chunk was dispatched. The chunk of data selected by the MUX 132 for output is then propagated downstream within the processor pipeline to the instruction pre-decoder 108 and eventually to the instruction decoder 122 for decoding.

Figure 6:
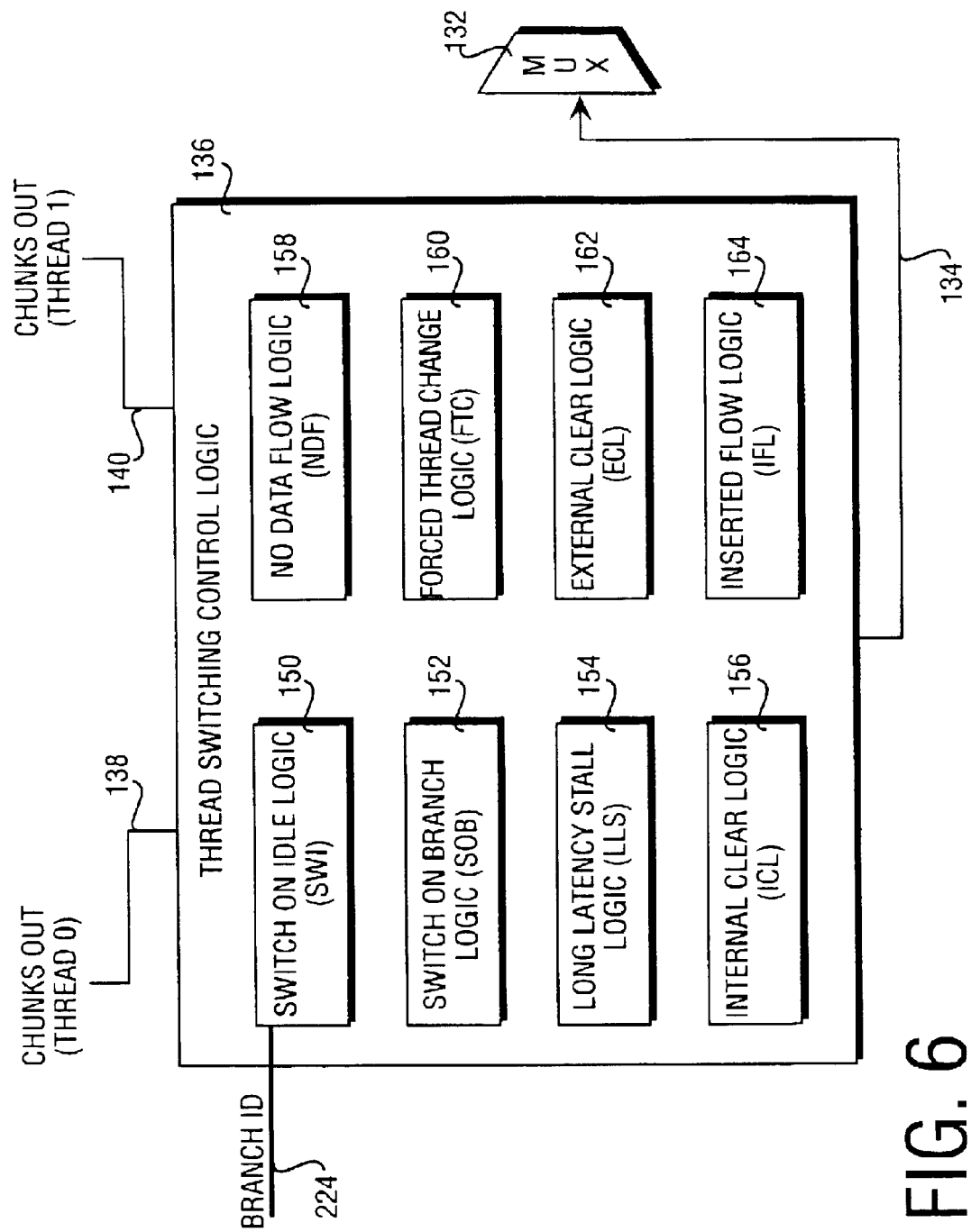
FIG. 6 is the block diagram illustrating logic components of thread switching control logic, according to an exemplary embodiment of the present invention.

FIG. 6 is a block diagram depicting the logic components of the thread switching control logic 136. Specifically, the thread switching control logic 136 is shown to include switch-on-idle logic 150, switch-on-branch logic 152, long latency stall logic 154, internal clear logic 156, no data flow logic 158, forced thread change logic 160, external clear logic 162, and inserted flow logic 164. While each of the logics 150–164 is shown in FIG. 6 to be discrete, there may be significant component sharing between the various logics, as will be described below. Each of the logics 150–164 implements a specific function that may cause the selection signal 134 to the MUX 132 to be asserted or de-asserted to thereby cause a thread switch in the manner described above. The functionality embodied within each of the logic 150–164 will be described with reference to the flowcharts provided in the FIGS. 7–14. Details of a specific exemplary embodiment are described with reference to FIGS. 15–16.

The Switch-on-Idle Logic (150)

Figure 7:
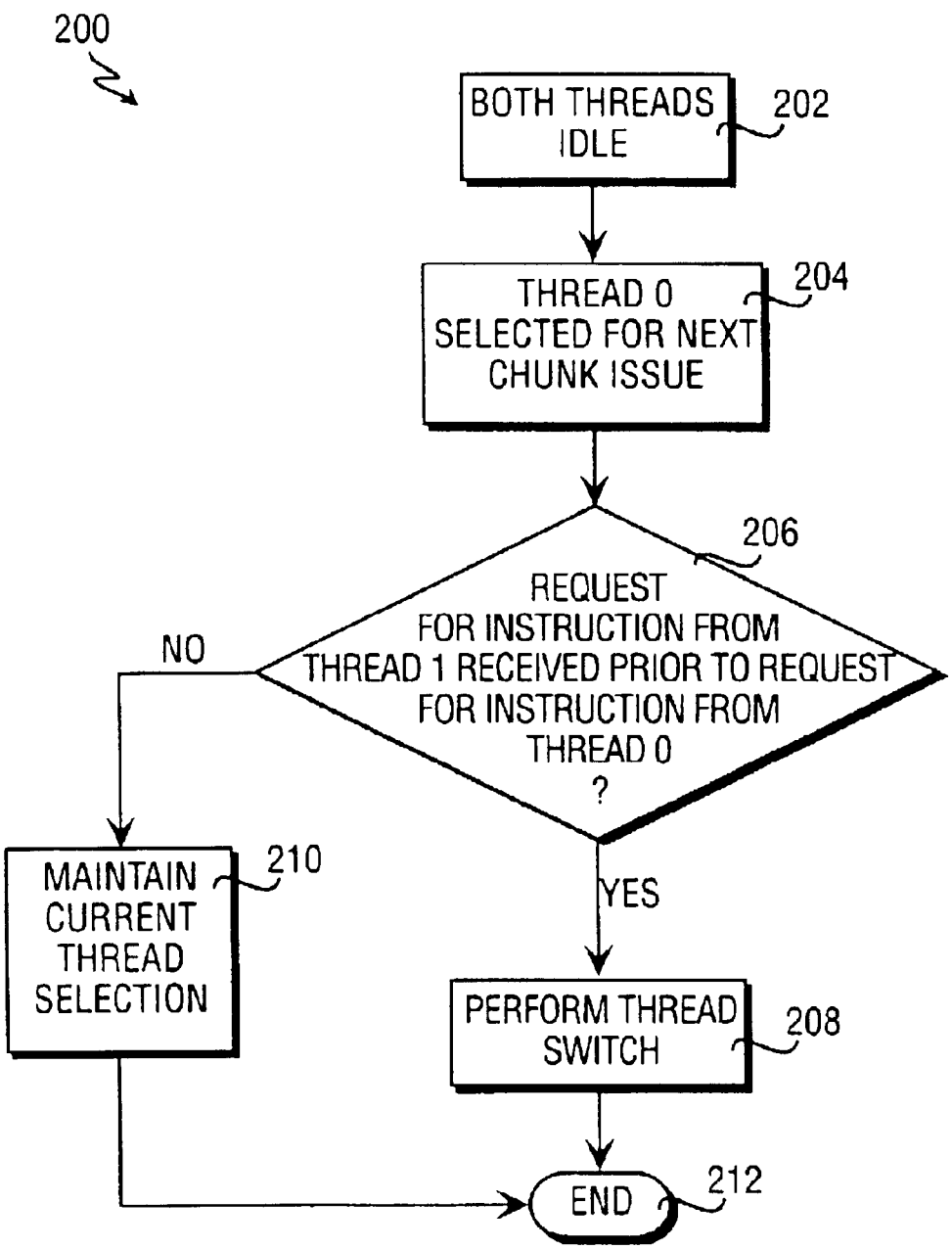
FIG. 7 is a flow chart illustrating the method, according to an exemplary embodiment of the present invention, of determining a commencement thread when multiple threads within a multithreaded processor are idle.

The switch-on-idle logic 150 determines which of a number of threads is selected as a commencement thread in the case where all threads are idle. FIG. 7 is a flowchart illustrating a method 200, according to exemplary embodiment of the present invention, of determining a commencement thread when two threads within a multithreaded processor are idle. It will be appreciated that the method 200 may also find application in a multithreaded processor supporting more than two threads. The method 200 may be implemented within the switch-on-idle logic 150. The method 200 commences at step 202 with an idle thread condition, in which both threads (i.e., thread 0 and 31) are idle. At step 204, a first thread (e.g., thread 0) is selected by the assertion or de-assertion of the selection signal 134 based on, merely for example, an indication in the microcode following a pipeline clearing event (e.g., a pipeline "nuke"). At decision box 206, a determination is made as to whether a request for an instruction of thread 1 is received prior to the receipt of a request for an instruction of thread 0. Referring to FIG. 5, it can be seen that the thread switching control logic 136 is coupled to receive an indication via a thread signal 137 from the next instruction pointer 100 as to the next instruction being retrieved from the unified cache 44. In this way the thread switching control logic 136, and specifically the switch-on-idle logic 150, is able to identify the thread to which the next instruction request is directed. Referring again to FIG. 7, if a request for an instruction of thread 1 is received prior to a request for an instruction of thread 0, a thread switch is then performed at step 208. Alternatively, the current thread selection is maintained at step 210. The method 200 then ends at step 212.

The Switch-on-Branch Logic (152)

In a microprocessor 30, such as the illustrating FIG. 2, that employs a branch prediction mechanism, the possibility of a misspredicted branch is of course present. For this reason, one exemplary embodiment of the present invention proposes a thread switching scheme that, on encountering a branch instruction that is predicted, by the branch prediction unit, to be TAKEN within the instruction stream of a specific thread, performs a thread switch. This is done to reduce the allocation of processor resources to that specific thread in view of the possibility of the relevant branch instruction being misspredicted and the speculative nature of the instruction stream proceeding the branch instruction. In this way, a speculative instruction stream for a thread that may proceed a misspredicted branch is prevented from penetrating too deeply into the processor pipeline at the expense of a further thread that may not include a branch instruction for a significant extent thereof.

Figure 8:
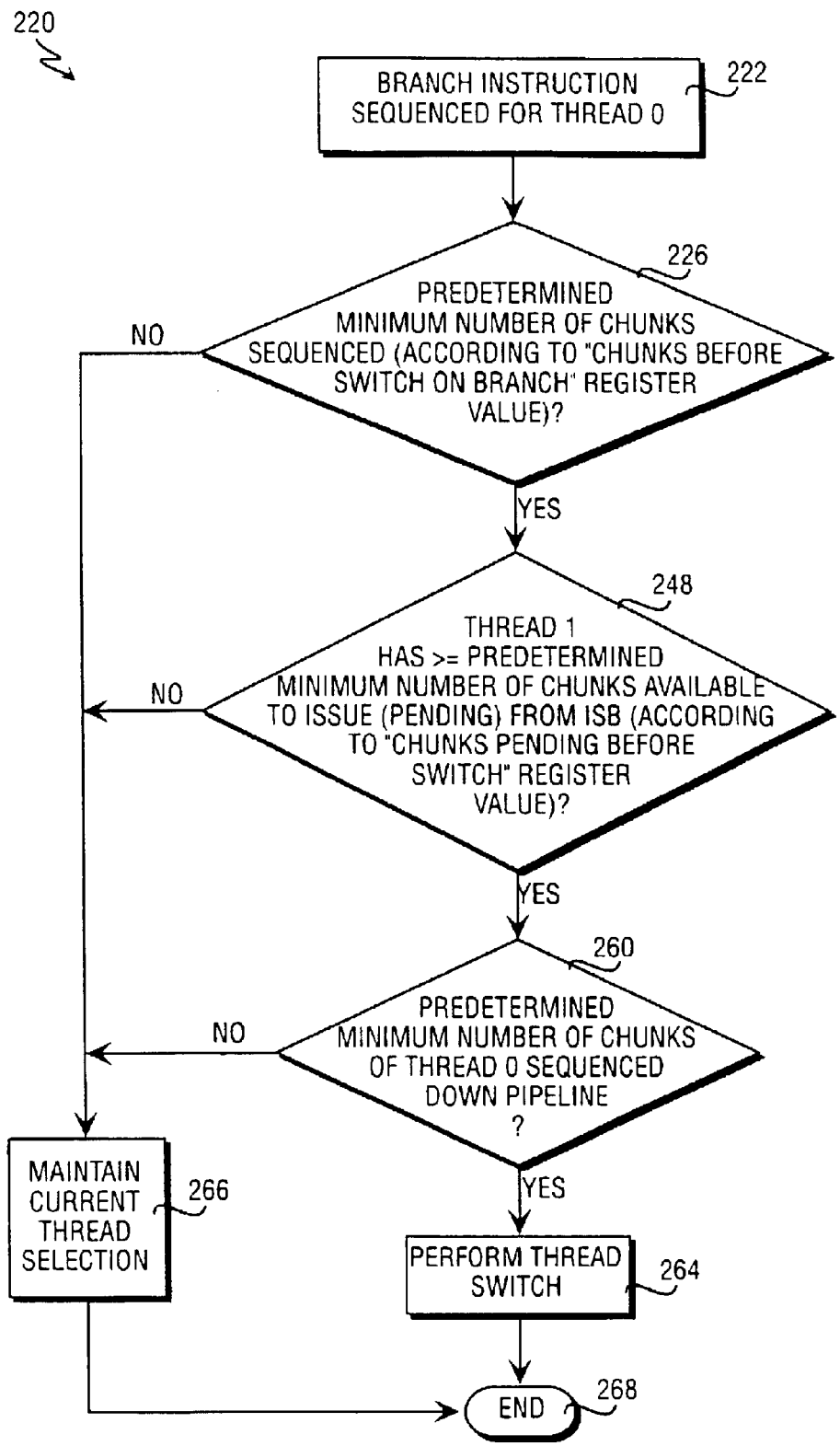
FIG. 8 is a flow chart illustrating a method, according to exemplary embodiment of the present invention, of performing a thread switching operation within a multithreaded processor on the dispatch of a branch instruction of a current thread from an instruction source.

FIG. 8 is a flowchart illustrating a method 220, according to exemplary embodiment of the present invention, of performing a thread switching operation within a multithreaded processor on the sequencing (or dispatch) of a branch instruction of a current thread (e.g., thread 0) from the instruction streaming buffer 106 to the instruction pre-decoder 108. The method 220 commences at step 222 where a branch instruction is sequenced by the allocation block 125 to be issued from a logical partition 122 or 124 of the array (e.g., from logical partition 122 allocated to thread 0). The thread switching control logic 136, and more specifically the switch-on-branch logic 152, receives a branch identifying signal 224 (BPsbsawbranch) from the allocation block 125 illustrated in FIG. 5.

The branch identifying signal 224 is asserted by the allocation block 125 to identify a branch instruction that has been predicted by the branch prediction unit 99 as being TAKEN. Specifically, the branch predictor 104 will make a prediction as to whether a specific branch instruction will be taken or not taken utilizing any one of the number of well-known prediction and methodologies or algorithms (e.g., based on a recorded branch history for the relevant branch instruction). The branch predictor 104 will then set a bit associated with the relevant instruction, and propagated with the instruction downstream within process pipeline together with the "request identifier", so that it can be associated with the relevant allocation by the allocation block 125. It should be noted that the branch identifying signal 224 is only asserted for branch instructions that are predicted to be TAKEN, and not those that are predicted to be NOT TAKEN. However, in an alternative embodiment of the present invention, the branch identifying signal 224 may be asserted when encountering any branch instruction for which any prediction has been made.

FIG. 15 illustrates the branch identifying signal 224 as providing input to an AND gate 225.

At decision box 226, a determination is made as to whether a predetermined minimum quantity of instruction information (e.g., a predetermined minimum number of chunks) for the current thread (thread 0) has been dispatched (or sent) from the instruction streaming buffer 106. This end, and referring to FIG. 15A, the switching control logic 136 includes a counter in the form of a chunk sent incrementer 228 that maintains a count of chunks dispatched from a current logical partition 122 or 124 of the instruction streaming buffer 106 prior to a thread switch. The chunk sent incrementer 228 is incremented by the output of an AND gate 230 that receives the three inputs. A BPready signal 232 is asserted by the allocation block 125 to indicate that a chunk is ready to be dispatched from the relevant logical partition 122 or 124. A thread signal 234, associated with the ENTRY (from the thread switching control logic 136), identifies the thread (and accordingly the logical partition 122 or 124) to which the chunk ready to be dispatched belongs. A NOT(IStall) signal 236 indicates that no stall condition has been encountered at the instruction steering logic 110. On the assertion of the signals 232–236, the output of the AND gate 230 is asserted and the chunk sent incrementer 228 is incremented so as to record the sequencing of a chunk for dispatch from the instruction streaming buffer 106.

The thread switching control logic 136 further includes a "chunks before switch on branch" register 238 that is, in one embodiment of the present invention, programmable via a control register bus 240 to store a value indicative of a predetermined number of chunks that are required to have been sequenced from the instruction streaming buffer 106 before a thread switching operation responsive to a branch instruction may occur. In an alternative embodiment of the present invention, the value indicative of the predetermined number of chunks may be hardwired. The switching control logic 136 further includes a comparator 242 that performs a comparison operation with respect to the output of the incrementer 228 and the register 238, and asserts a signal to the AND gate 244 in the event that the value indicated by the incrementer 228 exceeds the value stored within the register 238. The assertion of the output signal of the comparator 242 corresponds to a positive determination at decision box 226 in FIG. 8.

The AND gate 230 also provides input to the AND gate 225, and the assertion of the output of the AND gate 230 together with the assertion of the branch identifying signal 224 cause the output of the AND gate 225 (i.e., a branch sent signal 227) to be asserted as input to the AND gate 244. The assertion of the branch sent signal 227 represents the occurrence of the event detected at step 222.

Following a positive determination at decision box 226, the method 200 proceeds to decision box 248, where a determination is made as to whether a predetermined minimum quantity of instruction information (e.g., a predetermined minimum number of chunks) for an alternative thread (e.g., thread 1) are pending and available for dispatch from the logical partition 124 of the instruction streaming buffer 106. This determination is advantageous in that it prevents a thread switch from occurring when insufficient instruction information has been buffered within the instruction streaming buffer 106 for the target thread to warrant a thread switch to such a target thread. Specifically, a thread switch may consume more clock cycles than would potentially be required to again supply instruction information for a current thread. For example, a thread switching operation may require six cycles, whereas there may exist a high probability that instruction information for a current thread may be received within three clock cycles.

Referring again to FIG. 15, an exemplary implementation of the thread switching control logic 136 may include a "chunks pending before switch" register that is programmable via the control register bus 240 to store a value indicative of a predetermined minimum number of chunks for a target thread (e.g., thread 1) that should be buffered within an array partition (e.g., partition 124) before a thread switch to that target thread is permissible. In an alternate embodiment of the present invention, the value indicative of this predetermined number of chunks may again to be hardwired. The thread switching control logic 136 also includes a "count chunks pending" incrementer 252 that maintains a count of the number of chunks for a target thread (i.e., not a current thread) that are stored within the instruction streaming buffer 106. The incrementer 252 is incremented by an "IPD send chunk pending" signal 254 that is asserted by the allocation block 125 when a chunk of instruction information received from the unified cache 44 is assigned to an entry within the buffer 106. The allocation block 125 utilizes the "thread identifier", discussed above and associated with each chunk retrieved responsive to a next instruction request, to identify whether a specific chunk is for the target thread, and not for the current thread. A comparator 256 compares the respective values stored within the register 250 and the incrementer 252 and asserts an output signal to the AND gate 244 when the value maintained by the incrementer 202 exceeds the value stored in the register 250. The assertion of the output signal of the comparator 256 corresponds to a positive determination at decision box 248 shown in FIG. 8.

Following a positive determination at decision box 248, the method 220 proceeds to decision box 260, where a determination is made as to whether a predetermined quantity of instruction information for the current thread has been sequence down the pipeline of the microprocessor 30. This determination is advantageous in that it guarantees forward progress of the current thread prior to a thread switching operation. In one exemplary embodiment of the present invention employing the Intel Architecture (IA) instruction set, a determination is made as to whether three (3) chunks of instruction information for the current thread have been sequenced, as this guarantees at least one complete instruction for the current thread.

In alternative embodiment of the present invention, the determination made at decision box 260 may be dispensed with as the detection of the sequencing of a branch instruction, which itself constitutes at least one complete instruction, insures compliance with the determination at decision box 260.

Figure 15A:
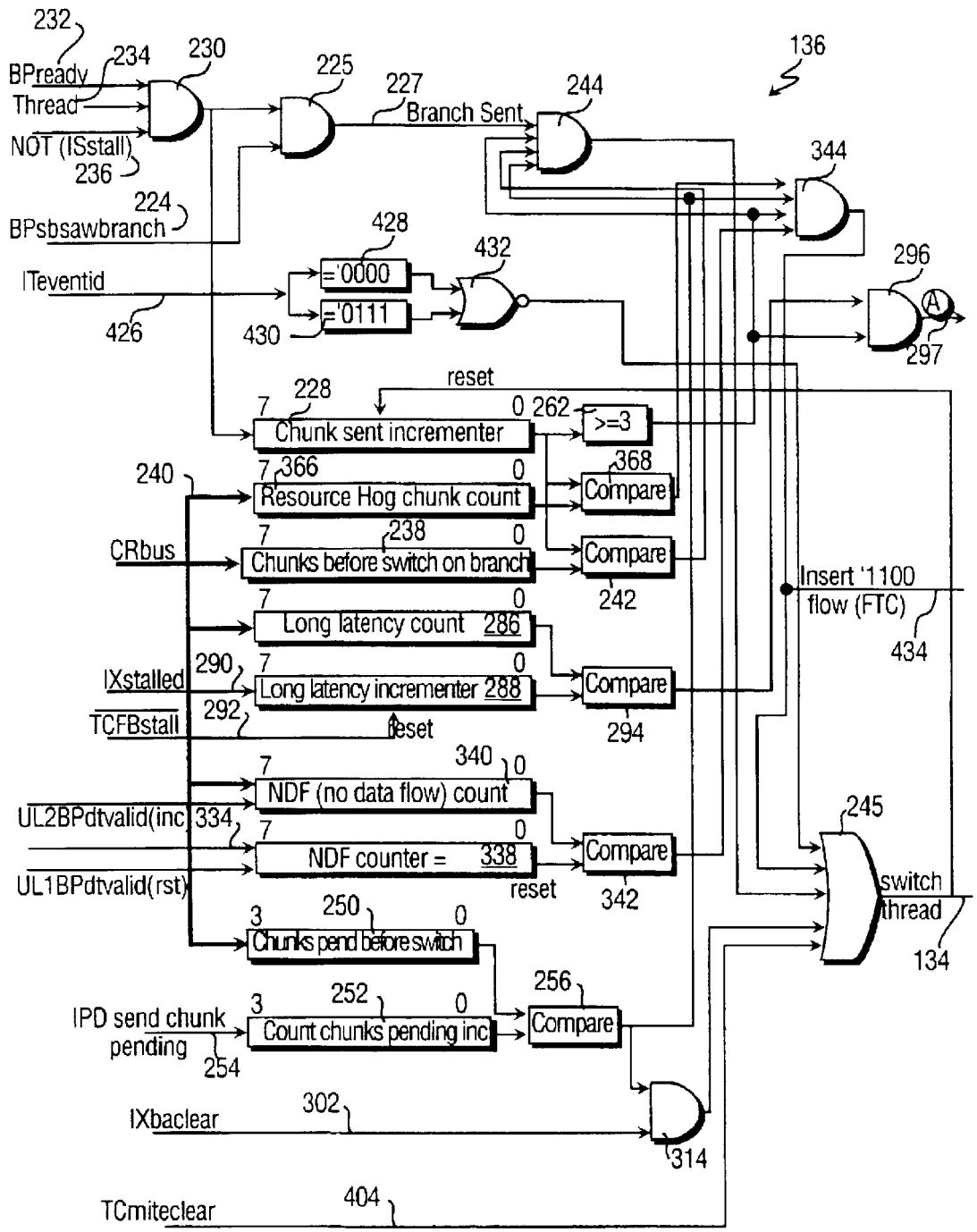
FIGS. 15A and 15B are schematic illustrations showing the structure of respective exemplary embodiments of the thread switching control logic, according to the present invention, illustrated in block diagram form in FIG. 6.
Figure 16:
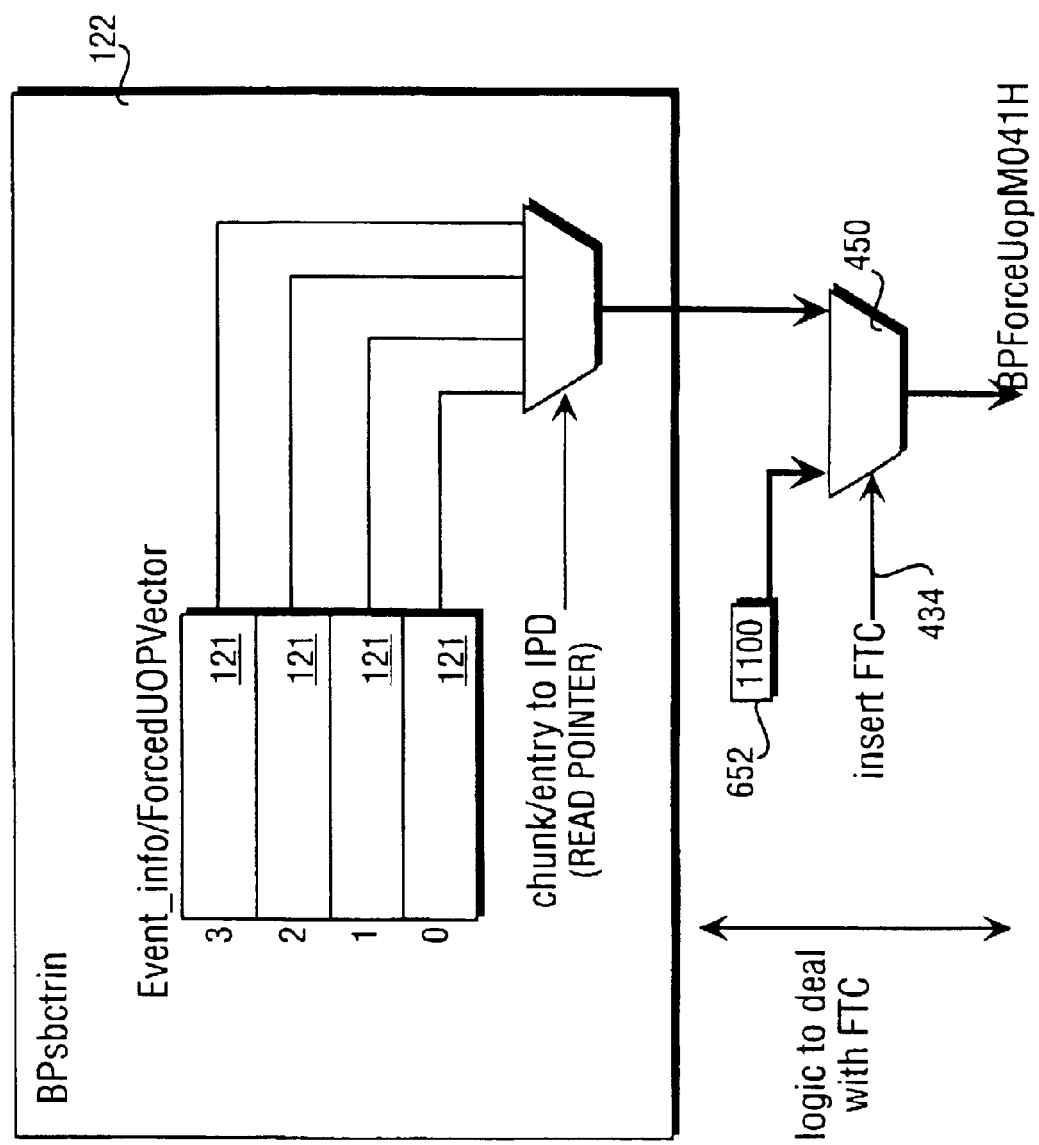
FIG. 16 is a schematic illustration of logic, according to exemplary embodiment of the present invention, for inserting a flow marker (or inserted flow) into an instruction stream.

Referring to FIG. 15A, an exemplary embodiment of the thread switching control logic 136 may include a comparator 262 that ascertains whether the count value maintained by the "chunk sent" incrementer 228 is greater than or equal to a predetermined minimum value, for example 3. In alternative embodiments of the present invention, this predetermined minimum value may be either programmable or hardwired. If the value maintained by the incrementer 228 is equal to, or exceeds, the predetermined minimum value, the comparator 262 asserts an output signal to the AND gate 244. The assertion of the output signal of the comparator 262 corresponds to a positive determination at decision box 260 shown in FIG. 8.

Following a positive determination at decision box 260, a thread switching operation is then performed at step 264, the conditions represented by decision boxes 226, 248 and 260 having been met. On the other hand, should any one of the conditions presented by decision boxes 226, 248 or 260 not been met, a current thread selection is maintained at step 266. The method 220 then terminates at step 268.

It will be appreciated that the conditions represented by the step 222, and the decision boxes 226,248 and 260 represent the four inputs to the AND gate 244 shown in FIG. 15A, and that when these conditions are all met, the output of the AND gate 244 will be asserted and provide an input to an OR gate 245. The output of the OR gate 245 constitutes the thread selection signal 134 outputted from the thread switching control logic 136. The assertion of the output of the OR gate 245 corresponds to the performance of the thread switching operation at step 264.

While the above embodiment of the present invention is described as having been implemented with an incrementer 228, a "chunks before switch on branch" register 238 and the comparator 242, it will readily be appreciated that other exemplary embodiments of the invention may be implemented by substituting the incrementer 228 with a decrementor that is pre-loaded with the value contained in the register 238 whenever a thread switch occurs. The decrementor, in this embodiment, is decremented each time a chunk is dispatched from a current logical partition 122 or 124 of the instruction streaming buffer 106. The decrementor then asserts an output signal (corresponding to the output signal of the comparator 242 in the previously described embodiment) to indicate a positive determination at decision box 226. The decrementor may, in this embodiment, also be decremented by the output of the AND gate 230.

The Long Latency Stall Logic (154)

Due to the limited resources that are available for allocation to an instruction stream of a specific thread within a processor pipeline of a multithreaded processor, and also due to branch misspredictions and cache misses, stalls within such a processor pipeline are commonplace. Specifically, referring to the microprocessor 30 shown in FIG. 2, it may occur that the allocator 76 determines that insufficient resources (e.g., physical registers, or entries within the reservation stations or reorder buffer 78 which are logically partition between thread 0 and thread 1) are available for instructions (i.e., microinstructions) for a particular thread received from the queue 68. In this case, the allocator 76 asserts a stall signal 82, specific to a thread, which is propagated via the trace delivery engine 60 to the microinstruction translation engine 54. On the assertion of such a stall signal 82 for a particular thread, it may be desirable to perform a thread switching operation. The long latency stall logic 154 embodies the circuitry for implementing a thread switching operation in the case of a processor pipeline stall.

Figure 9:
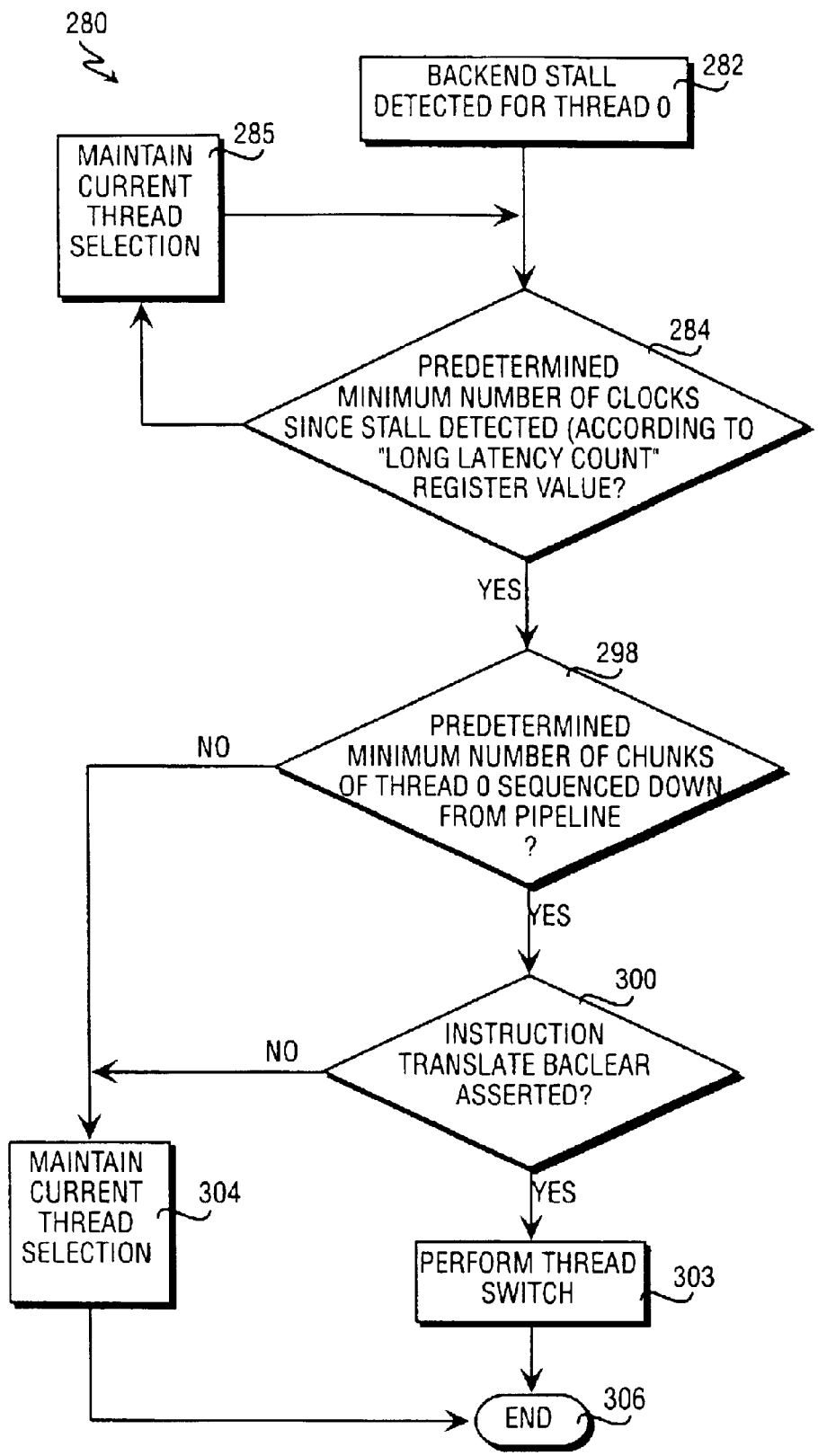
FIG. 9 is a flow chart illustrating a method, according to an exemplary embodiment of the present invention, of performing a thread switching operation within a multithreaded processor on the occurrence of a long latency stall.

FIG. 9 is a flowchart illustrating a method 280, according to an exemplary embodiment of the present invention, of performing a thread switching operation within a multithread processor on the occurrence of a long latency stall due, for example, to a stall within a processor pipeline as a result of resource unavailability, a branch missprediction, or a cache miss. The method 280 commences at step 282 where a stall condition is detected. As described above, this stall condition may be detected by determining assertion of the thread-specific stall signal 82 illustrated in FIG. 2. Alternatively, the stall condition may be detected by determining assertion of other stall signals asserted, for example, by the allocator 76, the trace cache 62 (both termed "Backend" stalls), the instruction decoder 112 or the instruction steering logic 110. At decision box 284 a determination is made whether a predetermined minimum number of clock cycles have elapsed since the stall was detected at step 282. Referring to FIG. 15, an exemplary implementation of the thread switching control logic 136 may include a "long latency count" register 286 that is programmable via the control register bus 240 to store a value indicative of this predetermined minimum number of clock cycles that must have elapsed since the detection of stall before a thread switch to a target thread is permissible. In an alternate embodiment of the present invention, the value indicative of this predetermined minimum number of clock cycles may be hardwired. The switching control logic 136 also includes a "long latency" incrementer 288 that maintains a count of the number of clock cycles that have elapsed since the detection of the stall at step 282. The incrementer 288 is incremented by an "IXstall" or instruction translate stall signal 290 that is asserted each clock cycle that the processor pipeline is stalled. The incrementer 288 is furthermore reset by the de-assertion of a "TCFBstall" signal 292 that is de-asserted when the stall is overcome. The "TCFBstall" signal 292 is asserted by a Trace Cache Fill Buffer (TCFB) (not show) that propagates an allocation stall signal 58 from the trace delivery engine 60 upstream to the microinstruction translation engine 54. A comparator 294 compares the respective values stored within the register 286 and the incrementer 288, and asserts output signal to an AND gate 296 when the value maintained by the incrementer 288 exceeds the value stored in the register 286. The assertion of the output signal of the comparator 294 corresponds to a positive determination at decision box 284 shown in FIG. 9.

If it is determined at decision box 284 that the predetermined number of clock cycles has not elapsed, the current thread selection is maintained at step 285, and the method 280 loops back to the decision box 284.

Following a positive determination at decision box 284, the method 280 proceeds to decision box 284, where a determination is made whether a predetermined minimum quantity of instruction information for the current thread has been sequenced down the pipeline of the microprocessor 30. As described above with reference to the decision box 260 shown in FIG. 8, this determination is made by the combination of the "chunk sent" incrementer 228 and the comparator 262. The comparator 262 provides an input to the AND gate 296, the output of the comparator 262 being asserted once a predetermined number of chunks for the current thread has been sequenced down the microprocessor pipeline.

The output signal 297 of the AND gate 296 is propagated to the branch address calculator 114, which then determines a restart instruction pointer for the thread from which the switch has been made (i.e., the current thread) and de-asserts a branch address clear (BAclear) signal for the current thread. At a more general level, when a thread switch occurs, an instruction pointer is required to identify a location from which to restart the thread from which the switch has occurred. This instruction pointer may be (1) the target of a branch instruction that is predicted as TAKEN, in which case the instruction pointer is provided by the switch-on-branch logic 152; (2) provided by the microcode; or (3) provided by the branch address calculator 114 (as is the case discussed immediately above).

Following a positive determination at decision box 298, a further determination is made at decision box 300 whether an instruction translate back-end clear signal 302 has been asserted. If so, then a thread switch is performed at step 303. Alternatively, following negative determinations at either decision boxes 298 or 300, the current thread selection is maintained at step 304. The method 280 then terminates at step 306.

The Internal Clear Logic (156)

An internal pipeline clearing operation is invoked from within the microinstruction translation engine 54 itself, as opposed to an external clear which is invoked from outside the microinstruction translation engine 54 (e.g., from the retirement logic in the form of a "nuke" clearing operation). Such clearing operations are desirable occasions for a thread switching operation as there is a high probability that the clearing operation was invoked as a result of a condition associated with a current thread, and an alternative thread may be better prepared (e.g., have filled buffers) for processing within the pipeline.

Figure 10:
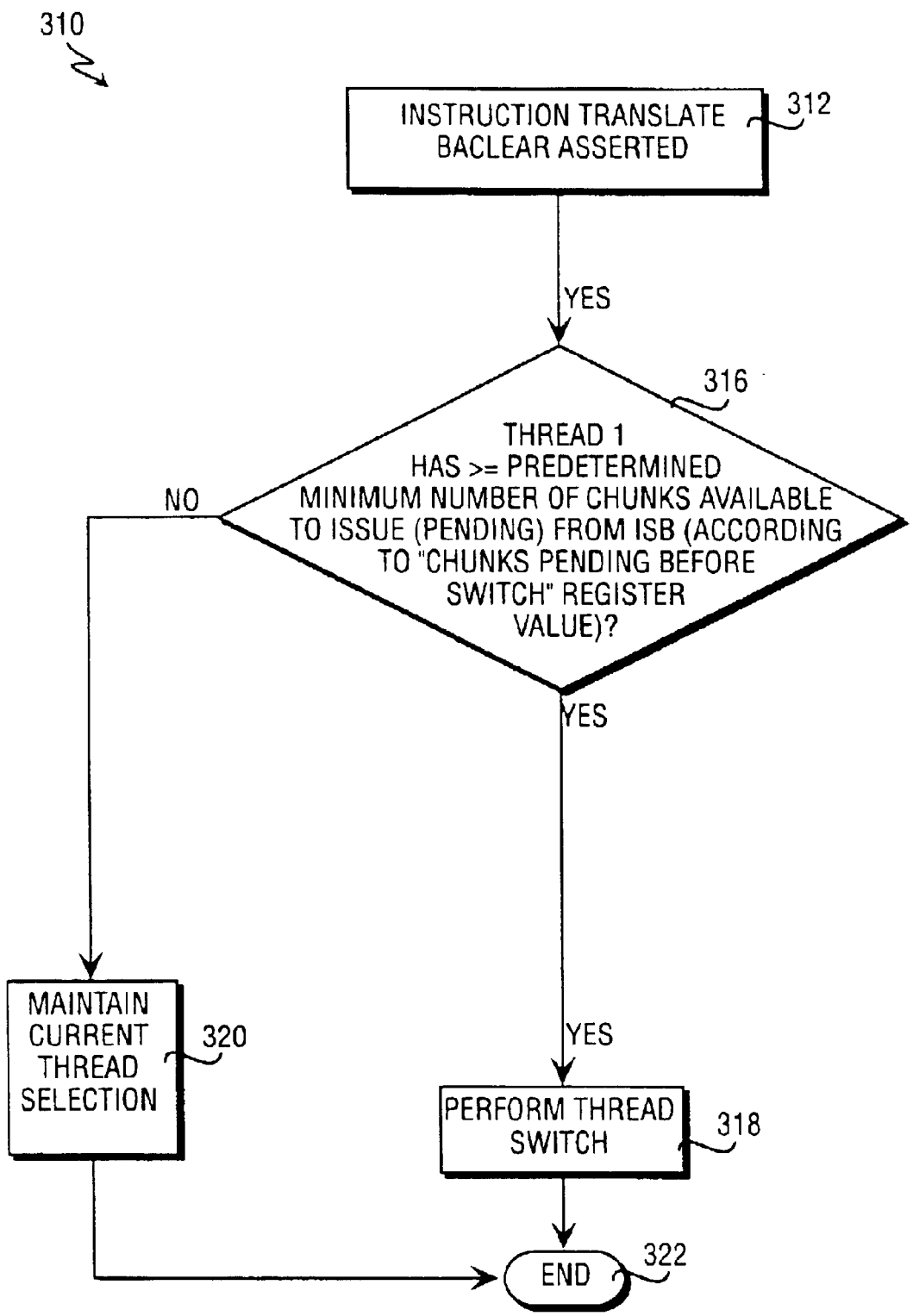
FIG. 10 is a flow chart illustrating a method, according to exemplary embodiment of the present invention, of performing a thread switching operation within a multithreaded processor on the occurrence of an internal pipeline clear.

FIG. 10 is a flowchart illustrating a method 310, according to an exemplary embodiment of the present invention, of performing a thread switching operation within a multithreaded processor on the occurrence of a internal pipeline clear. The method 310 commences at step 312, where the assertion of a clearing signal is detected. Referring to the exemplary embodiment of the switching control logic 136 shown in FIG. 15A, this may be performed by detecting the assertion of the instruction translate branch address calculator clear "IXbaclear" signal 302. Specifically, this signal 302 is shown to provide input into an AND gate 314, that further receives input from the comparator 256. As described above, the output of the comparator 256 is asserted when the number of chunks pending within the instruction streaming buffer 106, as recorded by the "count chunks pending" incrementer 252, exceeds the value stored within the "chunks pending before switch" register 250. Accordingly, the output of the comparator 256 is asserted to represent a positive determination of the condition represented by the decision box 316 of the method 310, following which a thread switching operation is performed at step 318. Specifically, when both inputs of the AND gate 314 are asserted, the output of the AND gate 314 is asserted that in turn provides an asserted input to the OR gate 245. On the other hand, should a negative determination be made at decision box 316, the current thread selection is maintained at step 320. The method 310 then terminates at step 322.

The No Data Flow Logic (158)

In situations in which a level 1 cache miss occurs for a current thread, a long latency operation typically results that may require a relatively large number of clock cycles to complete. If the conditions for a long latency operation that are specified by the flowchart shown in FIG. 9 are met, the long latency logic 154 may in this situation trigger a thread switching operation. However, if all conditions for a long latency operation are not met, the long latency logic 154 will not trigger a thread switching operation. In such situations, an alternative logic is required.

Figure 11:
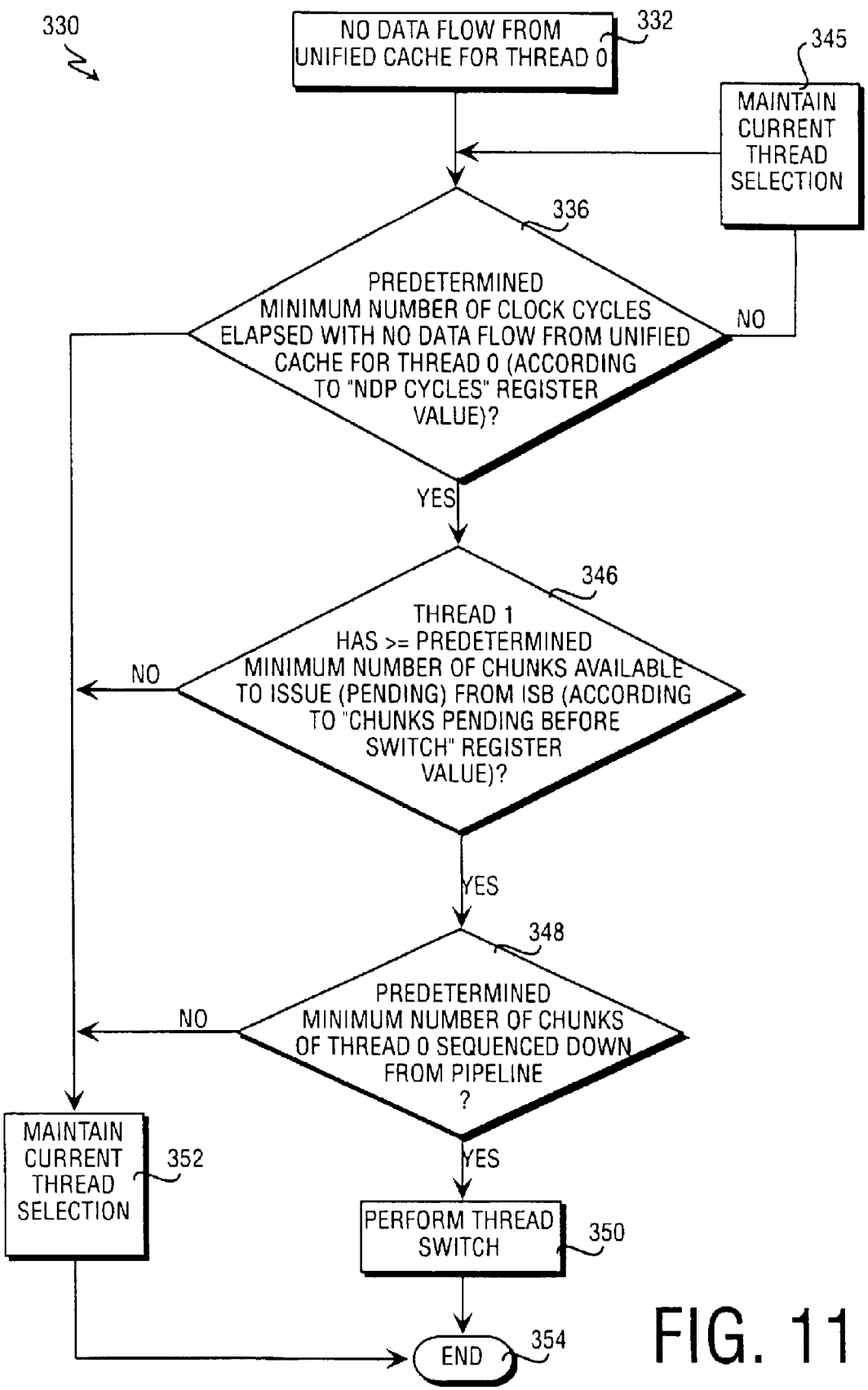
FIG. 11 is a flow chart illustrating a method, according to exemplary embodiment of the present invention, of performing a thread switching operation within a multithreaded processor on the occurrence of a "no data flow" condition with respect to a specific thread.

FIG. 11 is a flowchart illustrating a method 330, according to an exemplary embodiment of the present invention, of performing a thread switching operation within a multi-threaded processor on the occurrence of a "no data flow" condition with respect to a specific thread within the multithreaded processor. The method 330 commences at step 332, where the absence of an instruction flow for a current thread from the unified cache 44 to the instruction streaming buffer 106 is detected. Referring to FIG. 15A, in one exemplary embodiment, this may be detected by the assertion (or de-assertion) of a data flow signal 334 that is asserted by the unified cache 44 for each clock cycle during which an instruction stream is provided to the instruction streaming buffer 106. The "no data flow" condition may also be detected as a lock of the data flow to the instruction pre-decoder 108, as this implies a lock on the data flow from the unified cache 44 to the instruction streaming buffer 106. The "no data flow" condition may also be detected as a lock of the data flow to the instruction pre-decoder 108, as this implies a lock on the data flow from the unified cache 44 to the instruction streaming buffer 106.

At decision box 336, a determination is made as to whether a predetermined minimum number of clock cycles have elapsed with no data flow from the unified cache 44 to the instruction streaming buffer 106. To this end, the thread switching control logic 136 is shown in FIG. 15A to include a "no data flow" counter 338 that is incremented for each sequential clock cycle for which the data flow signal 334 is de-asserted, indicating the absence of an instruction stream to the instruction streaming buffer 106 for the current thread. The counter 338 may be reset by the assertion of the signal 335 that occurs upon the resumption of a data flow to the instruction pre-decoder 108 from the instruction streaming buffer 106. The signal 335 may be asserted responsive to an AND function performed on the signals 232 and 236 (i.e., the BPready and the NOT ISstall signals). The logic 136 further includes a "no data flow cycles" register 340 that is programmable via the control register bus 240 to store a value indicative of a predetermined minimum number of clock cycles before a no data flow condition can be detected. In an alternative embodiment of the present invention, the value indicative of this predetermined number of clock cycles may be hardwired. The counter 338 and the register 340 provide input to a comparator 342 that asserts an output to the AND gate 344 when the value maintained by the counter 338 exceeds the value stored within the register 340. The assertion of the output signal of the comparator 342 corresponds to a positive determination at the decision box 336 shown in FIG. 11.

In the event of a negative determination at decision box 336, the method 330 proceeds to step 345 where the current thread selection is maintained.

Following a positive determination at decision box 336, the method 330 proceeds to perform determinations at decision boxes 346 and 348 that correspond to the determinations made at decision boxes 248 and 260 of the method 220 shown in FIG. 8. Accordingly, the outputs of the comparators 256 and 262, that implement the determinations at decision boxes 346 and 348, are also shown to provide input to the AND gate 344. The output of the AND gate 344 again provides input to the OR gate 245. This provides an implementation of logic for performing the thread switching operation at step 350 of the method 330 if positive determinations occur with respect to decision boxes 336, 346 and 348. Alternatively, should a negative determination occur at any of the decision boxes 336, 346 or 348, the current thread selection is maintained at step 352. The method 330 then ends at step 354.

The Forced Thread Change Logic (160)

In certain situations, an instruction stream (comprising either a first or second thread) may be encountered that is particularly linear, and accordingly does not include many branch instructions. Assuming none of the other conditions discussed above or below occur, it is conceivable that such a linear thread may consume a disproportionate percentage of processor resources if no event occurs to trigger a thread switch. With a view to preventing such a linear thread from overreaching with respect to processor resources, one exemplary embodiment of the present invention proposes logic that triggers a thread switching operation following the sequencing or dispatching of a predetermined quantity of instruction information for a single thread from a resource, such as for example the instruction streaming buffer 106.

Figure 12:
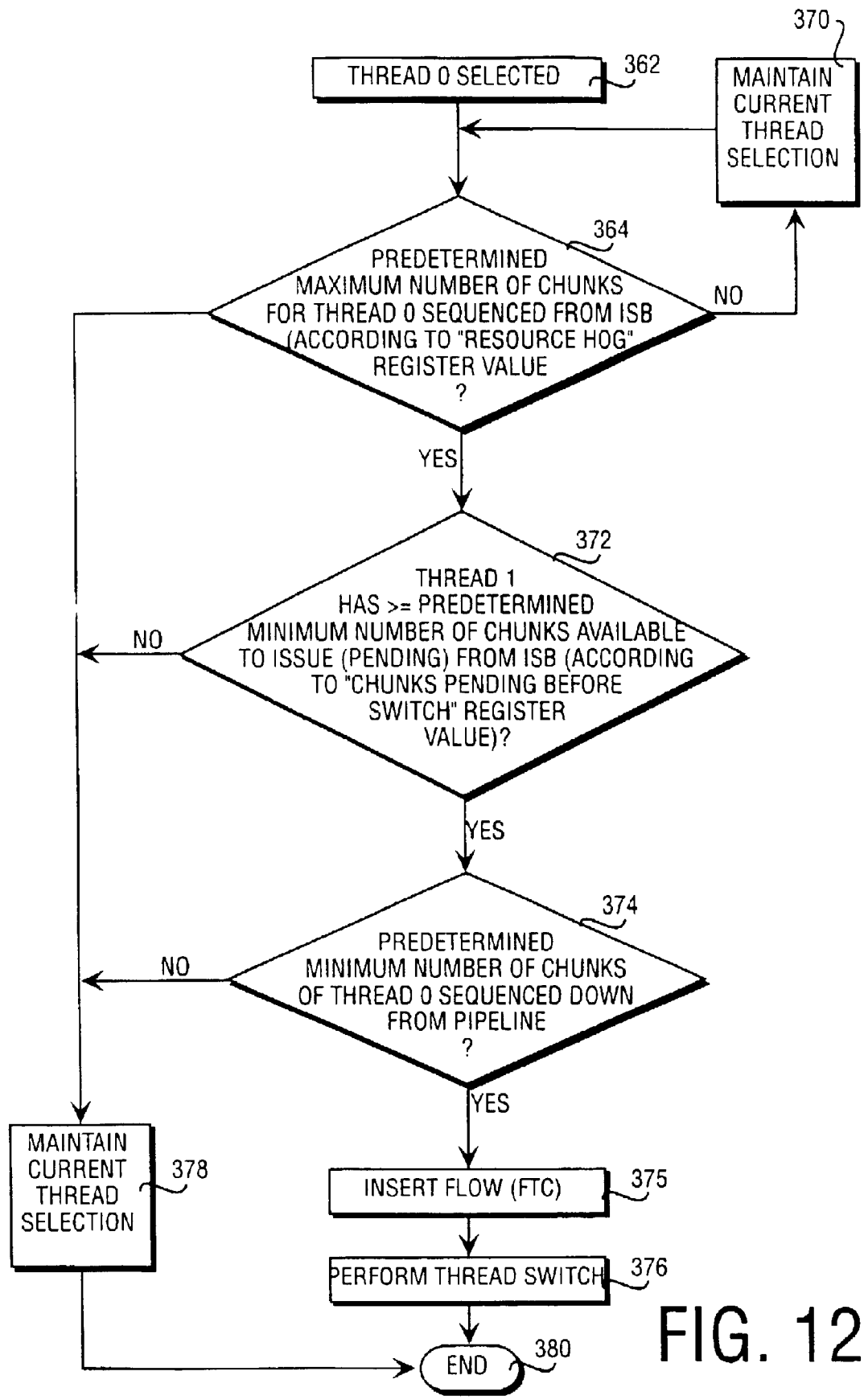
FIG. 12 is a flow chart illustrating a method, according to an exemplary embodiment of the present invention, of performing a thread switching operation within a multithreaded processor on the dispatch of a predetermined quantity of instruction information for a specific thread from an instruction streaming buffer to an instruction pre-decoder.

FIG. 12 is a flowchart illustrating a method 360, according to an exemplary embodiment of the present invention, of performing a thread switching operation within a multi-threaded processor on the sequencing (or dispatching) of a predetermined quantity of instruction information for a specific thread (e.g., thread 0) from the instruction streaming buffer 106 to the instruction pre-decoder 108. The method 360 commences at step 362, where instruction information for a specific thread (e.g., thread 0) is selected for sequencing and dispatch from the instruction streaming buffer 106. This selection may be represented by the state of the thread selection signal 134 outputted from the thread switching control logic 136 to the MUX 132.

At decision box 364, a determination is made as to whether a predetermined maximum quantity of instruction information for a current thread (e.g., thread 0) has been sequenced from the instruction streaming buffer 106. The exemplary thread switching control logic 136 illustrated in FIG. 15A is shown to include a "resource hog" register 366 that it is programmable via the control register bus 240 to store a value indicative of a predetermined maximum number of chunks for a specific thread that may be sequenced from the instruction streaming buffer 106 before a thread switching operation is triggered. In an alternative embodiment of the present invention, the value indicative of this predetermined maximum number of chunks may be hardwired. The "resource hog" register 366 and the "chunk sent" incrementer 228, which maintains a count of chunks issued from the buffer 106 for specific thread, provide input into a comparator 368 that asserts an output to an AND gate 344 when the value outputted by the incrementer 228 exceeds the value stored within the "resource hog" register 366. Accordingly, the assertion of the output signal of the comparator 368 corresponds to a positive determination at the decision box 364 shown in FIG. 12.

The output of the AND gate 344 is shown to provide input to the OR gate 245, and also to provide an "insert FTC" output 434.

In the event of a negative determination at decision box 364, the method 360 proceeds to step 370 where the current thread selection is maintained, whereafter the method 330 loops back to the decision box 364.

Following a positive determination at decision box 364, the method 360 proceeds to perform determinations at decision boxes 372 and 374 that correspond to the determinations made at decision boxes 248 and 260 of the method 220 shown in FIG. 8. Accordingly, the outputs of the comparators 256 and 262, that implement the determinations made at decision boxes 372 and 374, are shown to provide input to the AND gate 344.

Following positive determinations at decision boxes 336, 346 and 348, a flow marker (or "inserted flow") (e.g.,'1100) is inserted into the instruction stream dispatched from the instruction streaming buffer 106. Specifically, the inserted flow is necessary as the branch address calculator 114 will be required to restart fetching for the current thread, as the thread switching operation may have occurred on an incomplete instruction. In this case, the branch prediction unit 113 inserts the inserted flow into the instruction stream to indicate the forced thread change. The inserted flow has a ForceUOPValid that is asserted. The inserted flow is inserted only after a chunk has been scheduled to be sent to the instruction pre-decoder 108 from the instruction streaming buffer 106. Once the relevant chunk is dispatched, the inserted flow is MUXed into a ForceUOPVector field (event_info field). To this end, reference is made to FIG. 16 that illustrates the event_info field for chunks buffered within an exemplary array partition 122 within the instruction streaming buffer 106. The "insert FTC" output 434 is shown to operate a MUX 450 to select between (1) the current content of the event_info field 121 of a chunk stored within an entry 120 within the partition 122 and (2) the inserted flow 452. In the situation where the output 244 is asserted following an assertion of the output of the comparator 368, the inserted flow 452 will be inserted into the event_info field 121 of a chunk dispatched from the partition 122.

A thread switching operation is then performed at step 376 by the assertion of the selection signal 134 responsive to the assertion of the output of the AND gate 344. Alternatively, should a negative determination occur at any of the decision boxes 364, 372 or 374, the current thread selection is maintained at step 378. The method 360 then ends at step 380.

A thread switch operation initiated by the forced thread changed logic 160 differs from other thread switching operations discussed in the present specification in that the data chunk on which the thread switch occurs has no special or distinguishing feature that may provide some forewarning of a thread switch operation. Specifically, the thread switch operations performed by the other logics 150–164 within the thread switch control logic 136 are accompanied by a condition that makes the thread switch operation benign, and accordingly effected hardware requires no warning. The instruction steering logic 110 is not equipped to deal with a sudden and unanticipated thread switch operation. Thus, the inserted flow marker provides a mechanism to inform the instruction steering logic 110 of the thread switch operation that has occurred upstream.

Further, with a forced thread change, as with the other thread switch operations discussed in the present specification, a "restart" instruction pointer is required. As a break in the instruction flow is forced by the forced thread change logic 160, it is desirable to let microcode provided the restart pointer, as opposed to the next instruction pointer 100.

The External Clear Logic (162)

As described above with reference to the internal clear logic 156, an external clear is invoked from outside the microinstruction translation engine 54.

Figure 13:
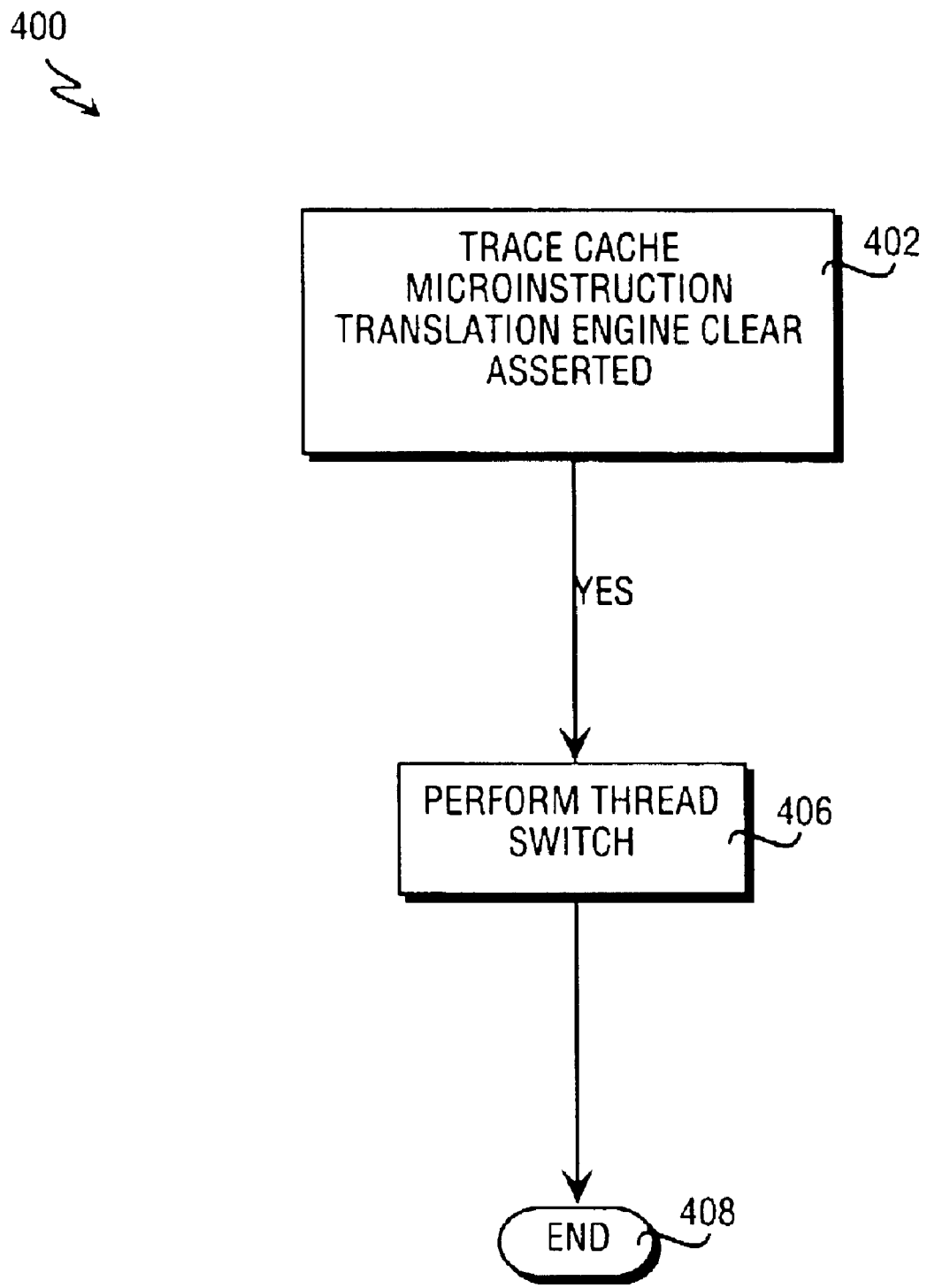
FIG. 13 is a flow chart illustrating a method, according to exemplary embodiment of the present invention, of performing a thread switching operations within a multithreaded processor on the occurrence of an external pipeline clear.

FIG. 13 is a flowchart illustrating a method 400, according to exemplary embodiment of the present invention, of performing a thread switching operation within a multi-threaded processor on the occurrence of an external pipeline clear. The method 400 commences at step 402, where the assertion of an external clearing signal is detected. Referring to the exemplary embodiment of the thread switching control logic 136 shown in FIG. 15A, this may be performed by detecting the assertion of a trace cache/microinstruction translation engine clear signal "TCmiteclear" 404 that provides direct input to the OR gate 245. Accordingly, assertion of the signal 404 will cause assertion of the thread selection signal 134 propagated from the thread switching control logic 136 to the MUX 132 as shown in FIG. 5. This is reflected at step 406 of the method 400, which thereafter terminates at step 408.

The Inserted Flow Logic (164)

Within the microinstruction translation engine 54, when the Instruction Translation Lookaside Buffer (ITLB) 102, shown in FIG. 3, registers a page miss, a flow marker (also termed an "inserted flow") is inserted into the instruction stream to mark this event. Such a page miss results in a relatively long page walk operation by a page miss handler (not shown) that may, merely for example, consume up to 150 clock cycles. In a multithreaded processor, where a page miss occurs for an instruction stream of a current thread, it may be advantageous to perform a thread switching operation so as to allow an alternative thread to utilize the latency introduced by the page walk operation. The inserted flow logic 164, as described above, provides an exemplary embodiment of logic that implements and performs a thread switching function on the occurrence of a page miss.

Other events, besides a page miss, that may result in an inserted flow are well-known in the art, or are otherwise specific to a microprocessor architecture.

Figure 14:
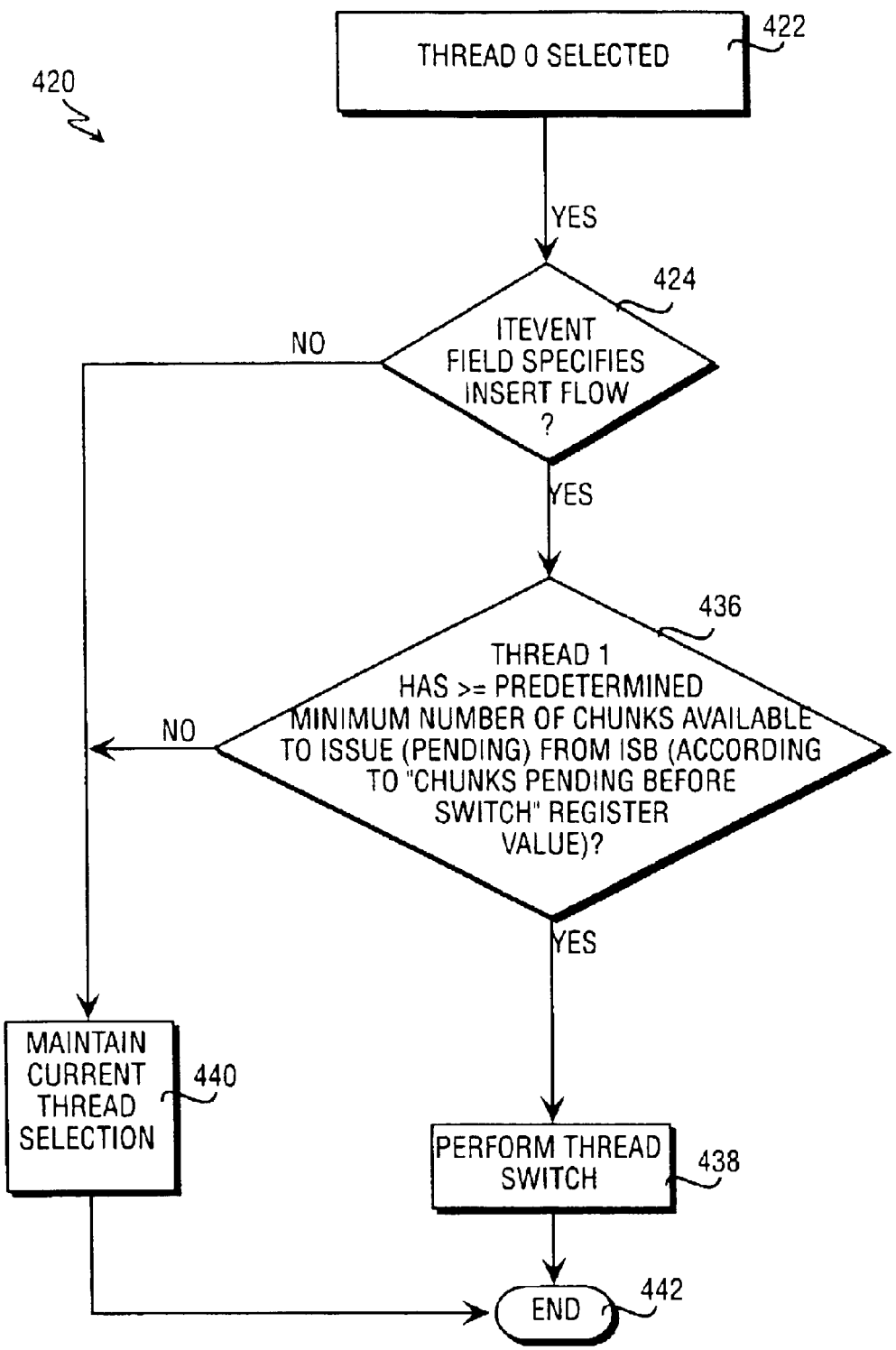
FIG. 14 is a flow chart illustrating a method, according to exemplary embodiment of the present invention, of performing a thread switching operation within a multithreaded processor on the detection of an inserted flow within an instruction stream for a current thread.

FIG. 14 is a flowchart illustrating a method 420, according to an exemplary embodiment of the present invention, of performing a thread switching operation within a multi-threaded processor on the detection of an inserted flow within an instruction stream for a current thread, the inserted flow indicating, merely for example, a page miss with respect to the instruction TLB 102. The method 420 commences at step 422 with the selection of a current thread (e.g., thread 0). This selection may be represented by the state of the thread selection signal 134 outputted from the thread switching control logic 136 to the MUX 132. At decision box 424, a determination is made as to whether an instruction translate event "ITeventid" field 426 within the instruction stream for the current thread specifies an inserted flow (e.g., does not have value of '0000 or '0111). Specifically, the presence of the above values within the instruction translate event field 426 may indicate the absence of an inserted flow. Referring to FIG. 15A, the field 426 is shown to be inputted to a pair of comparators (or other logic) 428 and 430 that determine whether the field 426 includes either the value '0000 or '0111. If so, a comparator 428 or 430 asserts an output to a NOR gate 432, the output of which provides an input to the OR gate 245.

At decision box 436, a determination may optionally be made as to whether a predetermined minimum quantity of instruction information for a target thread (e.g., thread 1) is available for dispatch from the instruction streaming buffer 106. This determination may be made utilizing the output of the NOR gate 42 with the output of the comparator 262.

Following positive determinations at decision boxes 424 and 436, a thread switching operation may then be performed at step 438. Specifically, the assertion of the output of the NOR gate 42, which is propagated through the OR gate 245 to cause the selection signal 134 to be asserted, may correspond to the thread switching operation performed at step 438. Alternatively, should a negative determination result at either of the decision boxes 424 or 436, the current thread selection is maintained at step 440. The method 420 then terminates at step 442.

CONCLUSION

Figure 15B:
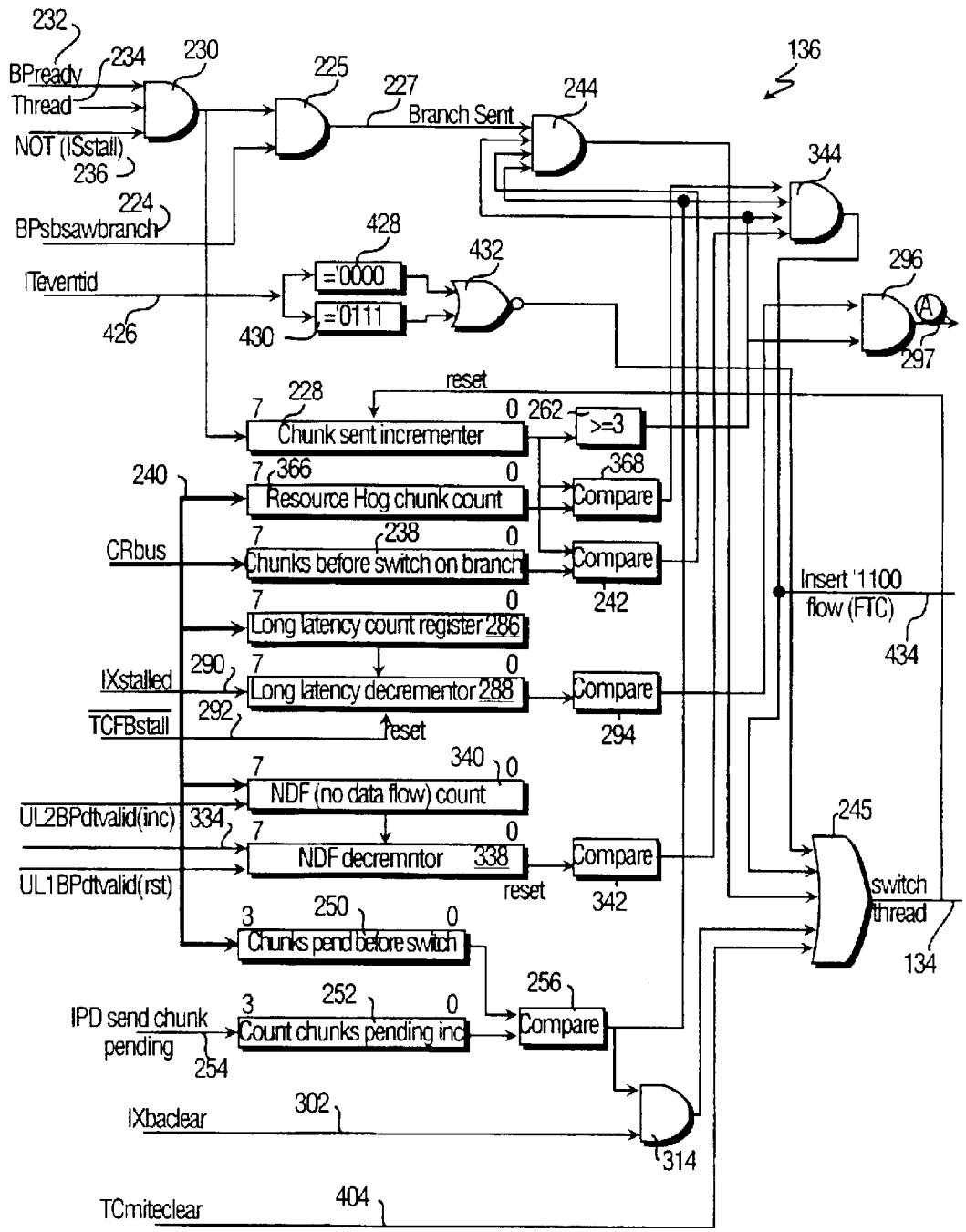

In the exemplary embodiment of the thread switching control logic 136 discussed above with reference to FIG. 15, a number of the logics 150–164 are described as being implemented utilizing the combination of incrementer, register and comparator. In an alternative embodiment of present invention, some or all of these logics may be implemented using a decrementor that merely decrements from a predetermined, programmable value and asserts a signal on reaching a zero value. An example of such an embodiment is illustrated in FIG. 15B.

In summary, the above described thread switching logic 136 is advantageous in that it provides a number of flexible mechanisms for implementing and performing thread switching operations responsive to the occurrences of events at which it may be beneficial to perform such thread switching operations. Further, by including programmable parameters, one exemplary embodiment of the present invention allows for the modification and fine-tuning of thread switching mechanisms for a variety of situations and considerations. For example, when executing one type of application, such as a multi-media application, it may be desirable to have the parameters of the thread switching mechanisms set to different values than when executing a different type of application, such as a word processing application.

The thread switching logic 136 is suited for time slicing the bandwidth of a path (between a source resource and a destination resource) and/or a processing resource within a multithreaded processor. While the thread switching logic 136 is described above as being utilized to dispatch instruction information for two threads from an instruction streaming buffer to an instruction pre-decoder, it will readily be appreciated that the teachings of the present invention could be utilized to dispatch instruction information for multiple threads from any resource to any destination within a processor pipeline.

Thus, a method and an apparatus for thread switching within a multithreaded processor have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method including:

detecting dispatch of a predetermined quantity of instruction information of a first thread from an instruction information source within a multithreaded processor;

responsive to the detection of the dispatch of the predetermined quantity of instruction information of the first thread, inserting a flow marker into an instruction stream, the instruction stream including the instruction information of the first thread dispatched from the instruction information source, and the flow marker indicating that a thread switching operation has occurred; and responsive to the detection of the dispatch of the first predetermined quantity of the instruction information of the first thread, commencing dispatch of instruction information of a second thread from the instruction information source.

2. The method of claim 1, wherein the detecting of the dispatch of the predetermined quantity of the instruction information of the first thread comprises maintaining a count of discrete quantities of the instruction information of the first thread dispatched from the instruction information resource, and determining that the count of the discrete quantities of the instruction information exceeds a predetermined threshold value.

3. The method of claim 2, wherein the detecting comprises performing a comparison operation between the predetermined threshold value and content of a counter that maintains the count of the discrete quantities of the instruction information of the first thread dispatched from the instruction information source.

4. The method of claim 1, wherein the instruction information source is partitioned into a first partition to supply the instruction information of the first thread and a second partition to supply the instruction information of the second thread, and wherein the commencement of the dispatch of the instruction information of the second thread comprises operating thread selection logic to select instruction information of dispatch from the second partition.

5. The method of claim 1, wherein the instruction information source comprises an instruction streaming buffer.

6. The method of claim 1, wherein the instruction information comprises macroinstruction information, and the instruction information is dispatched from the instruction information source to an instruction decoder.

7. The method of claim 6, wherein the instruction decoder is to decode instruction information dispatched from the instruction information source without performing any distinction between the instruction information of the first thread and the instruction information of the second thread.

8. Apparatus comprising:

detection logic to detect sequencing of a predetermined quantity of instruction information of a first thread from an instruction information source within a multithreaded processor;

a flow inserter to insert a flow marker into an instruction stream, the instruction stream including the instruction information of the first thread dispatched from the instruction information source, and the flow marker indicating that a thread switching operation has occurred; and selection logic, coupled to the detection logic, to commence sequencing of instruction information of a second thread from the instruction information source responsive to the detection of the sequencing of the predetermined quantity of the instruction information of the first thread from the instruction information source.

9. The apparatus of claim 8, wherein the detection logic includes a counter to maintain a count of discrete quantities of the instruction information of the first thread sequenced from the instruction information source.

10. The apparatus of claim 9, wherein the detection logic includes a comparator to detect that the count of the discrete quantities of the instruction information of the first thread exceeds a first predetermined threshold value.

11. The apparatus of claim 8, wherein the instruction information source is partitioned into a first partition to supply the instruction information of the first thread and a second partition to supply the instruction information of the second thread, and wherein the selection logic is to commence the sequencing of the instruction information of the second thread by selecting instruction information from the second partition of sequencing.

12. The apparatus of claim 8, wherein the instruction information source comprises an instruction streaming buffer.

13. The apparatus of claim 8, wherein the instruction information comprises macroinstruction information, and the instruction information is sequenced from the instruction information source to an instruction decoder.

14. The apparatus of claim 13, wherein the instruction decoder is to decode instruction information sequenced from the instruction information source without performing any distinction between the instruction information of the first thread and the instruction information of the second thread.

15. Apparatus comprising:

detection means for detecting dispatch of a predetermined quantity of instruction information of a first thread from an instruction information source within a multithreaded processor;

flow inserting means for inserting a flow marker into an instruction stream, the instruction stream including the instruction information of the first thread dispatched from the instruction information source and the flow marker indicating that a thread switching operation has occurred; and selection means, coupled to the detection means, for commencing dispatch of instruction information of a second thread from the instruction information source responsive to the detection of the dispatch of the predetermined quantity of the instruction information of the first thread from the instruction information source.

16. A multithreaded processor comprising:

a processor pipeline including an instruction information source;

a detector to detect sequencing of a predetermined quantity of instruction information of a first thread from the instruction information source;

a flow inserter to insert a flow marker into an instruction stream, the instruction stream including the instruction information of the first thread dispatched from the instruction information source and the flow marker indicating an occurrence of a thread switching operation; and a selector, coupled to the detector, to commence sequencing of instruction information of a second thread from the instruction information source responsive to the detection of the sequencing of the predetermined quantity of the instruction information of the first thread from the instruction information source.

* * * * *